US008433739B2

(12) United States Patent
Ha

(10) Patent No.: US 8,433,739 B2
(45) Date of Patent: *Apr. 30, 2013

(54) METHODS AND SYSTEMS FOR DETECTING REPETITIVE SYNCHRONIZED SIGNAL EVENTS

(75) Inventor: Stephen T. Ha, Greenville, TX (US)

(73) Assignee: L-3 Communications Integrated Systems, L.P., Greenville, TX (US)

(*) Notice: Subject to any disclaimer, the term of this patent is extended or adjusted under 35 U.S.C. 154(b) by 1413 days.

This patent is subject to a terminal disclaimer.

(21) Appl. No.: 11/823,472

(22) Filed: Jun. 27, 2007

(65) Prior Publication Data
US 2009/0003422 A1     Jan. 1, 2009

(51) Int. Cl.
*G06F 17/14*     (2006.01)

(52) U.S. Cl.
USPC .......................................... 708/400; 708/200

(58) Field of Classification Search .................. 708/400
See application file for complete search history.

(56) References Cited

U.S. PATENT DOCUMENTS

| | | | | | |
|---|---|---|---|---|---|
| 5,305,349 | A | * | 4/1994 | Dent ............................ | 370/209 |
| 5,841,817 | A | * | 11/1998 | Krieger et al. ................ | 375/340 |
| 6,011,625 | A | * | 1/2000 | Glass ............................ | 356/496 |
| 6,233,347 | B1 | * | 5/2001 | Chen et al. .................... | 382/100 |
| 6,539,336 | B1 | * | 3/2003 | Vock et al. .................... | 702/182 |
| 6,654,408 | B1 | * | 11/2003 | Kadous et al. ................ | 375/148 |
| 6,678,263 | B1 | * | 1/2004 | Hammons et al. ............ | 370/342 |
| 7,277,797 | B1 | * | 10/2007 | Kunitsyn et al. .............. | 702/15 |
| 7,430,257 | B1 | * | 9/2008 | Shattil .......................... | 375/347 |
| 7,545,901 | B2 | * | 6/2009 | Mistretta ....................... | 378/4 |
| 2005/0137815 | A1 | * | 6/2005 | Quinlan et al. ................ | 702/75 |
| 2007/0153947 | A1 | | 7/2007 | Ha | |

OTHER PUBLICATIONS

Introduction to Computer Programming with MATLAB—Lecture 9: Spectral Analysis, 2006, UCLA Department of Phonetics and Linguistics, pp. 1-5.*
James Tsui, From Digital Techniques for Wideband Receivers "Chapter 10: Phase Measurements and Zero Crossings", 2004, Sci Tech Publishing, Second Edition, pp. 329-361.*
Averbuch et al, "Fast Slant Stack: A Notion of Radon Transform for Data in a Cartesian Grid Which Is Rapidly Computible, Algebraically Exact, Geometrically Faithful and Invertible", 2001; 40 pgs.
Adaptive Research Notes, "Investigating Adaptations to Climate Change by Natural Resource Dependent Societies in Southern Africa: A Framework for Investigating Climate Change", Note 2, Nov. 2003, 3 pgs.
Tatham, "Multidimensional Filtering of Seismic Data", Proceedings of the IEEE, vol. 72, No. 10, Oct. 1984, 19 pgs.

(Continued)

*Primary Examiner* — Chat Do
*Assistant Examiner* — Kevin G Hughes
(74) *Attorney, Agent, or Firm* — O'Keefe, Egan, Peterman & Enders LLP

(57) ABSTRACT

Repetitive synchronized signal events may be detected in received raw signal data that contains a signal. The type of signal, element length (or minimum interval) and/or other characteristics of such repetitive synchronized signal events may also be optionally determined. The disclosed methods and systems may be implemented for processing signals in real time as part of a receiver or transceiver system, or may be implemented by one or more computer processing components that are configured to process stored raw signal data or signal data received from another source, such as across a computer network.

48 Claims, 17 Drawing Sheets

OTHER PUBLICATIONS

Ginkel et al., "A Short Introduction to the Random and Hough Transforms and How They Relate to Each Other", Quantitative Imaging Group Technical Report Series, No. QI-2004-01, Feb. 2004, 11 pgs.
Copending Application, "Methods and Systems for Processing and Displaying Data", filed Jun. 27, 2007; U.S. Appl. No. 11/823,465; 50 pgs.
Pace, "Detecting and Classifying Low Probability of Intercept Radar", Chapter 11, 2004, 35 pgs.
Pace, "Detecting and Classifying Low Probability of Intercept Radar", 2004, 14 pgs.
"Image Projections and The Radon Transform", printed from Internet Jun. 22, 2007, 14 pgs.
Liley, "The Radon Transform", Mar. 1998, 2 pgs.
Ha, "Method and Systems for Processing and Displaying Data", U.S. Appl. No. 11/823,465, Office Action mailed Apr. 1, 2011, 14 pgs.
Varable Density Versus Wiggles, "Variable Density Versus Wiggle Displays", Printed from Internet Dec. 16, 2011, 4 pgs.
Wikipedia, "Randon Transform", Printed from Internet Dec. 16, 2011, 7 pgs.
Russell, "Superposition of Waves", Printed from Internet Dec. 16, 2011, 3 pgs.
Wikipedia, "Gaussian Function", Printed from Internet Dec. 16, 2011, 6 pgs.
Sheriff et al., Exploration Seismology, vol. 1, Section 2.3.3, 1982, 2 pgs.
Sheriff, Encyclopedic Dictionary of Exploration Geophysics, 1991, 3 pgs.
Ha, "Method and Systems for Processing and Displaying Data", U.S. Appl. No. 11/823,465, Response to Final Office Action; Feb. 27, 2012, 30 pgs.
Ha, "Method and Systems for Processing and Displaying Data", U.S. Appl. No. 11/823,465, Final Office Action mailed Oct. 27, 2011, 20 pgs.
Ha, "Method and Systems for Processing and Displaying Data", U.S. Appl. No. 11/823,465, Response to Office Action mailed Jul. 1, 2011, 32 pgs.

* cited by examiner

METHODS AND SYSTEMS FOR DETECTING REPETITIVE SYNCHRONIZED SIGNAL EVENTS

FIELD OF THE INVENTION

The present invention relates generally to signal processing, and more particularly to processing raw signal data to detect repetitive synchronized signal events therein.

BACKGROUND OF THE INVENTION

Signals are often processed to extract certain events from raw received signal data. Extraction of events from raw signal data requires that the events be detected within the raw signal data. Examples of events that may be present in received signals include repetitive synchronized events such as phase transitions in a phase-shift key (PSK) signal, frequency slope changes in a frequency modulated continuous wave (FMCW) signal, and frequency transitions in a frequency-shift key (FSK) signal. Such events occur with a frequency or a sub-frequency of a given baud. Other examples of repetitive synchronized events are envelopes of a PSK, FSK or FMCW signal that repeat in a non-random manner with a group pattern.

One existing real-time continuous wave (CW)/PSK system attempts to recognize element length for a PSK signal by collecting statistics of the time intervals between successive spikes from the rectified average delta phase derived from the PSK signal. Using this method, the most often occurring interval is recognized as the element length. However, this method is adversely affected by unwanted noise spikes that occur in-between good signal spikes, because such noise spikes change the time interval evaluation. For FMCW signals, the Kalman filter followed by a frequency peak detection method may be used to detect time intervals between successive frequency slope changes, and as with processing of PSK signals, the most often occurring time interval is recognized as the element length. However, this method is also adversely affected by unwanted noise created frequency slope changes that occur between two good frequency slope changes.

The Radon transform is known for its use in reconstructing images from medical computer tomography. In this application, the Radon transform describes the absorption of X-ray radiation as it traverses in a straight line in the human body. A formula for the Radon transform is:

$$A = \int_S \mu(x) dx$$

where A is the relative X-ray transmission, $\mu$ is the absorption coefficient, and the integral is taken along a straight line s. By inverting the above integral equation, an image of the absorption coefficient $\mu$ is constructed.

A "tau-p" transform is a form of the Radon transform used in seismic signal processing for attenuating straight line events, like the undesirable direct arrival. In a simple form, the Radon transform sums data values that lie on a straight line, and events that have the characteristics of a straight line can be identified by a large Radon sum. Because most noise is incoherent, it will not line up nicely in a straight line. Therefore the Radon transform is a useful tool in identifying straight-line coherent noise events like the direct arrival from a noisy background. In the case of seismic processing, the coherent direct arrival is identified and removed. Alternatively, the Radon transform may be used to identify and then extract lines, edges, curves, textures, or shapes. The Radon transform may be generalized to an integral along a curve, in which case it will enhance a curved event. The Hough transform is sometimes used where patterns are extracted from an image.

Time-time plots have been used to display climate study data reflecting intensity of a dry season and to display pulsed signal (i.e., radar) information.

SUMMARY OF THE INVENTION

Disclosed herein are methods and systems that may be implemented to recognize or detect a repetitive synchronized event contained in raw signal data, identify the signal type, and/or to optionally compute one or more characteristics of a detected repetitive synchronized event (e.g., element length for a PSK signal, element length and/or frequency change slope for a FMCW signal, etc.). Using the disclosed methods and systems, reinforceable repetitive synchronous data (e.g., such as rectified average delta data, envelope data, etc.) may be generated from raw signal data. A time-time plot may be generated from the reinforceable repetitive synchronous data and a Radon transform sum taken across the time-time plot in a manner that allows data spikes from repetitive synchronized events present in the raw signal data to re-enforce one another regardless of noise spikes that may occur elsewhere in the raw signal data, e.g., so as to transform a particular signal into a form in such a way that it manifests strong recognizable spectral components. In this regard, the disclosed methods and systems offer the advantage of processing the raw signal data using a Radon transform sum to re-enforce the presence of repetitive synchronized event data so that they occur in a consistent manner along straight lines on the time-time plot. Although random noise may also be prevalent in the raw signal data, these noise do not generally occur in the form of straight lines on the time-time plot and hence do not result in a large Radon sum. Thus, a given signal (e.g., radio frequency signal such as RF communication signal, radar signal, optical signal, acoustic signal such as sonar or seismic signal, etc.) present within the raw signal data may be reduced to data pattern/spikes of high cyclicity that re-enforce each other when summed appropriately. This re-enforcement of repetitive events enables the detection of a much lower SNR signal than existing methods, including signals received from weak transmitters and/or at great distances.

Advantageously, the disclosed methods and systems may be employed to process a signal in a manner that produces much cleaner repetitive event peaks than conventional signal processing methods employing a Fourier spectrum, and to depict a repetitive "group" pattern of a radar or communication signal that would not be readily revealed by the Fourier spectrum. Additionally, the disclosed methods and systems may be employed to yield a more accurate estimate of the element length without resorting to higher number of samples.

Advantageously, the disclosed methods and systems may be implemented in one exemplary embodiment to detect the presence of a repetitive synchronized event (e.g., from a PSK, FSK or FMCW radar or communication signal) in a low signal-to-noise (SNR) environment, i.e., where the radar or communication signal has a low SNR. For example, the presence of a repetitive synchronized event and element length (i.e., which is the reciprocal of baud) of the repetitive synchronized event may be computed in one exemplary embodiment from PSK and FMCW signals having SNR values of less than or equal to about −10 decibels. In another exemplary embodiment, PSK signals having SNR values of less than or equal to about −18 db at 32 MHz bandwidth may be detected and the repetitive synchronized event element length of the PSK signals computed. This is as compared to typical conventional methodology that is only capable of computing the element length from PSK and FMCW signals having a SNR value of not less than 5 db. The disclosed methods and systems may also be implemented for deriving element length (i.e., minimum interval) for detection of poly-phase signals In one respect, disclosed herein is a method of processing signal data that includes receiving the signal data; obtaining reinforceable repetitive synchronous data from the signal data; obtaining time-time data from the reinforceable repetitive synchronous data, the time-time data including multiple data traces; adding the time-time data in phase across the multiple data traces to obtain a sum of the time-time data; and outputting the sum of the time-time data for at least one of display, storage, or further processing.

In another respect, disclosed herein is a method of detecting repetitive synchronized signal events that includes detecting the presence of a repetitive synchronized signal event in signal data from an in-phase sum of reinforceable repetitive synchronous data across multiple traces obtained from the signal data.

In another respect, disclosed herein is a system for processing signal data, including one or more system components configured to: receive the signal data; obtain reinforceable repetitive synchronous data from the I-Q data; obtain time-time data from the reinforceable repetitive synchronous data, the time-time data including multiple data traces; and add the time-time data in phase across the multiple data traces to obtain a sum of the time-time data.

In another respect, disclosed herein is a system for detecting repetitive synchronized signal events, the system including: an event detector, the event detector being configured to receive signal data and obtain an in-phase sum of reinforceable repetitive synchronous data from the signal data. In one embodiment, the event detector may be further configured to detect the presence of a repetitive synchronized signal event in the signal data from the in-phase sum of reinforceable repetitive synchronous data obtained from the signal data.

In another respect, disclosed herein is a system for processing and displaying data, including one or more system components configured to: process time-time data to obtain a Radon sum of the time-time data; provide the Radon sum of the time-time data for display (e.g., by outputting a data signal suitable for generating a graphical representation of the Radon sum of the time-time data); and graphically displaying the Radon sum of the time-time data using the provided Radon sum of time-time data (e.g., by using an output data signal to generate a graphical representation of the Radon sum of the time-time data by at least one of a video display or hard copy print-out).

In another respect, disclosed herein is a method of processing and displaying data, including: obtaining time-time data; processing the time-time data to obtain a Radon sum of the time-time data; providing the Radon sum of the time-time data for display (e.g., by outputting a data signal suitable for generating a graphical representation of the Radon sum of the time-time data); and utilizing the provided Radon sum of time-time data to provide a graphical display of the Radon sum of the time-time data (e.g., by using an output data signal to generate a graphical representation of the Radon sum of the time-time data by at least one of a video display or hard copy print-out).

In another respect, disclosed herein is a system for processing and displaying data, including one or more system components configured to: process time-time data to obtain an in-phase sum of the time-time data; provide the in-phase sum of the time-time data for display; and graphically displaying the in-phase sum of the time-time data using the provided in-phase sum of time-time data.

In another respect, disclosed herein is a method of processing and displaying data, including: obtaining time-time data; processing the time-time data to obtain an in-phase sum of the time-time data; providing the in-phase sum of the time-time data for display; and utilizing the provided in-phase sum of time-time data to provide a graphical display of the in-phase sum of the time-time data.

DESCRIPTION OF ILLUSTRATIVE EMBODIMENTS

Using the disclosed methods and systems, repetitive synchronized signal events may be detected in received raw signal data, e.g., received raw radio frequency (RF) signal data that contains a radar or communication signal such as a PSK signal, FSK signal or FMCW signal. For a given received raw signal data, the type of signal (e.g., PSK, FSK, FMCW), element length (or minimum interval) and/or other characteristics of such repetitive synchronized signal events may also be optionally determined. Examples of such repetitive synchronized signal events include, but are not limited to, phase transitions in a phase-shift key (PSK) signal, frequency slope changes in a frequency modulated continuous wave (FMCW) signal, frequency transitions in a frequency-shift key (FSK) signal, and envelope of signals that repeat with a fixed periodic pattern. The disclosed methods and systems may be implemented in any manner and/or system configuration suitable for achieving the repetitive event detection results described elsewhere herein. For example, the disclosed methods and systems may be implemented for processing signals in real time as part of a receiver or transceiver system, or may be implemented by one or more computer processing components that are configured to process stored raw signal data or signal data received from another source, such as across a computer network.

Figure 1:
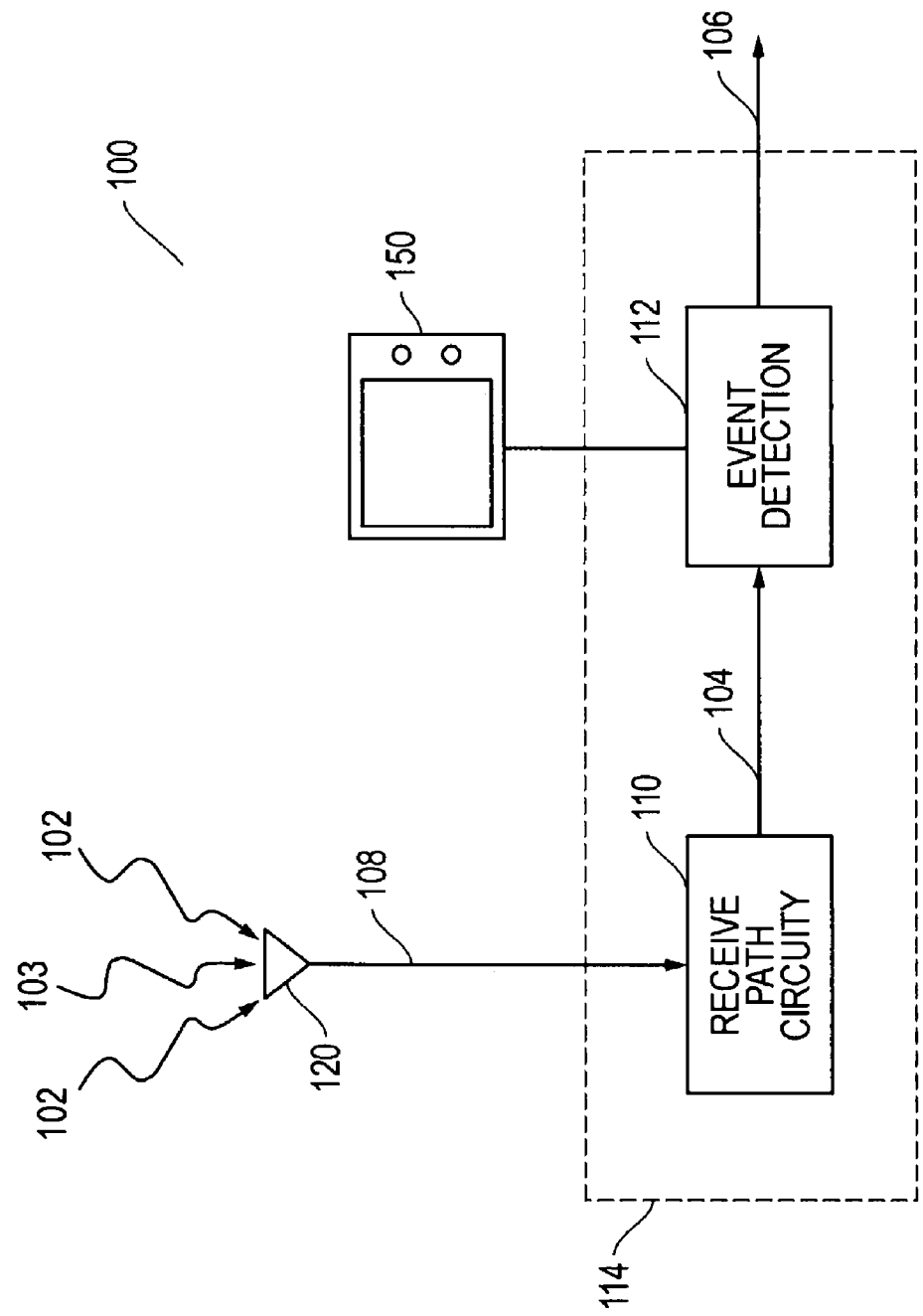
FIG. 1 is a block diagram of a system as it may be implemented according to one exemplary embodiment of the disclosed methods and systems.

FIG. 1 illustrates one exemplary embodiment of a system 100 as it may be implemented to receive raw RF signal data and to detect repetitive synchronized signal events therein in real time. In the illustrated exemplary embodiment a RF signal 103 (e.g., PSK, FSK, FMCW signal) that contains repetitive synchronized signal events is received simultaneously with noise and/or other RF signal energy 102 that is not of interest and that together may be characterized as raw signal data. As illustrated in FIG. 1, system 100 includes an antenna 120 that is coupled to receive and event detector 114 which, in this exemplary embodiment, includes receive path component/s 110 coupled to event detector component/s 112, it being understood that any other configuration of receive and event detector may be employed that is suitable for performing one or more of the event detection tasks described elsewhere herein. It will be understood that although FIG. 1 illustrates a system 100 configured to process RF communication signal data, that other embodiments of the disclosed methods and systems may be implemented with systems configured to receive and/or process other types of systems, e.g., acoustic signals such as sonar or seismic signals, radar signals, optical signals, etc.

System 100 is illustrated configured as a receive-only system in FIG. 1. However, it will be understood that in other embodiments the disclosed methods and systems may be alternatively implemented in a system configured as a transceiver. In addition, it is possible that more than one antenna 120 may be coupled to receive and event detector 114, and/or that antenna 120 may be a single element antenna or an antenna array. It will also be understood that the disclosed methods and systems may be implemented using any other system configuration that is suitable for outputting an in-phase sum (e.g., Radon sum) of time-time data for at least one of display, storage, and/or further processing. For example, a system may be configured to receive raw signal data and process the same to obtain the in-phase sum of time-time data, a system may be configured to obtain the time-time data itself (e.g., from storage, network, another device, etc.) and to process the time-time data to obtain the in-phase sum of time-time data, or a system may be additionally or alternatively configured with one or more display signal generation components to output for display the in-phase sum (e.g., Radon sum) of time-time data irrespective of the source of this data, etc.

Thus, FIG. 1 is exemplary only and any other configuration and/or combination of software, firmware, processor/s (e.g. central processing unit/s, microprocessor/s, field programmable gate array/s or other type of application specific integrated circuit, graphics processing units, etc.) or other hardware (e.g., graphic display hardware including video display devices such as cathode ray tube display, flat panel display, video projector, etc. or hard-copy display devices such as printer, plotter, etc.) that is suitable for displaying a graphical representation of an in-phase sum (e.g., Radon sum) of time-time data, and/or for performing other processing tasks (e.g., generating the in-phase sum of time-time data from appropriate input data and/or raw signal data) described herein. In this regard, examples of host computers or other computer elements that may be suitably employed are described and illustrated in U.S. Pat. No. 7,590,209 issued Sep. 15, 2009, which is incorporated herein by reference.

Returning to FIG. 1, antenna 120 is coupled to provide raw RF signal data 108 that contains signal 103 and noise and/or other RF signal energy 102 to receive path circuitry 110. Receive path circuitry 110 is configured to process or condition and digitize the received raw RF signal data 108 from antenna 120 so as to provide received raw digitized data signal 104 to event detector component/s 112 which may be implemented as part of a digital signal processor or with any other suitable combination of software, firmware and/or hardware components. Event detector component/s 112 is configured to receive received raw data signal 104 from receive path circuitry 110 and to process received raw data signal 104 so as to detect the presence of one or more repetitive synchronized signal events therein, identify the type of signal containing the detected repetitive synchronized events, and/or to optionally determine the element length or other characteristics of the detected repetitive synchronized signal events. In this regard event detector 112 may be configured to process received raw data signal 104 by performing (not necessarily in the following order) steps of mixing, filtering, decimation, detection of carrier frequency, I-Q conversion, tuning, and the transform techniques described elsewhere herein.

In the illustrated exemplary embodiment of FIG. 1, an output signal 106 is produced by event detector 112 that may include one or more of the following information: 1) the class of the signal, (i.e., either PSK, FSK or FMCW); 2) the element length; 3) the frequency of the carrier; 4) for FMCW signals, the frequency deviation of the chirp; and 5) for FMCW signal, the slopes of the chirp. In one embodiment, the class of the signal may be determined by the corresponding signal class algorithm that produces the best result, e.g., after processing the same signal data with two or more signal class algorithms. What is considered the best result may be determined by several factors including, but not limited to, the characteristics of the Radon sum, and the signal strength at the baud frequency.

In one exemplary embodiment, the time-time plot may also be graphically displayed (e.g., via video display, hard copy print-out, etc.) in real-time or at a later time, to serve to indicate to an operator the possible presence of a signal. In this regard, FIG. 1 shows optional video display 150 (e.g., CRT, LCD flat panel display, etc.) that may be present for graphically displaying Radon sum of time-time data or other type sum of time-time data obtained by adding time-time data in phase across multiple data traces. In another embodiment, Radon sum information or other type of sum of time-time data obtained by adding time-time data in phase across multiple data traces may be stored, e.g., output to memory for graphical display and/or further processing at a later time. In yet another embodiment, Radon sum information or other type of sum of time-time data obtained by adding time-time data in phase across multiple data traces may be output for further processing, e.g., output internally within event detector 112 for further processing within event detector 112 or output by event detector 112 as a signal to other processing components.

In the practice of the disclosed methods and systems event detector component/s, such as event detector component/s 112 of FIG. 1A, may be implemented using any configuration and/or combination of software, firmware, processor/s or other hardware that is suitable for detecting presence of repetitive synchronized signal events in a signal in a manner as described elsewhere herein. In one embodiment, event detector component/s 112 of FIG. 1 may be implemented as a digital-signal processor (DSP). Alternatively, or in addition to a DSP, event detector component/s 112 may be implemented using any other type/s of suitable signal processor/s, graphics processor/s, etc.

Figure 2:
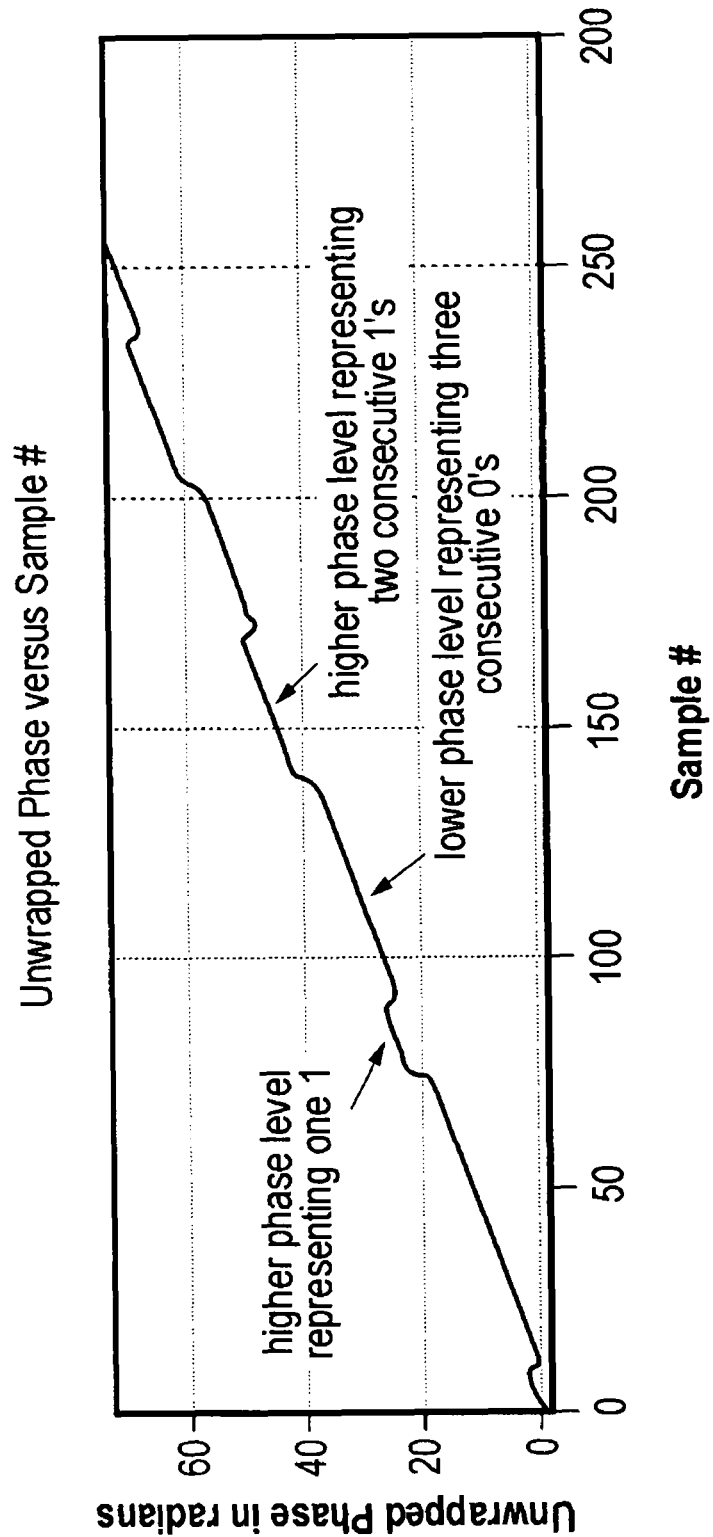
FIG. 2 is an example plot of unwrapped phase versus sample number for a binary PSK signal according to one exemplary embodiment of the disclosed methods and systems.

Examples of signals that contain repetitive synchronized signal events include PSK, FSK and FMCW signals. These signals include encoded data bits that may be transformed into a series of level changes (or a similar form of 0's and 1's). For example, FIG. 2 is an example plot of unwrapped phase versus I-Q samples (256 samples total) obtained from polar coordinates, arctan(Q/I), for a binary (poly-phase) PSK signal, e.g., as may be received as signal 103 by system of FIG. 1 and is further tuned coarsely. It may be seen if the plotted trace of FIG. 2 is rotated to be horizontal, a relative higher phase level represents "1", whereas a relative lower phase level represents "0". Although certain of the Figures herein illustrate processing of a PSK signal, it will be understood that the disclosed methods and systems may be employed to process other types of signals that contain repetitive synchronized signal events. For example, differentiation of the unwrapped phase obtained from the I-Q samples for FSK signal data results in a series of frequency level changes. For FMCW signal data, double differentiation of the unwrapped phase obtained from the I-Q samples results in a series of frequency slope level changes.

Figure 3:
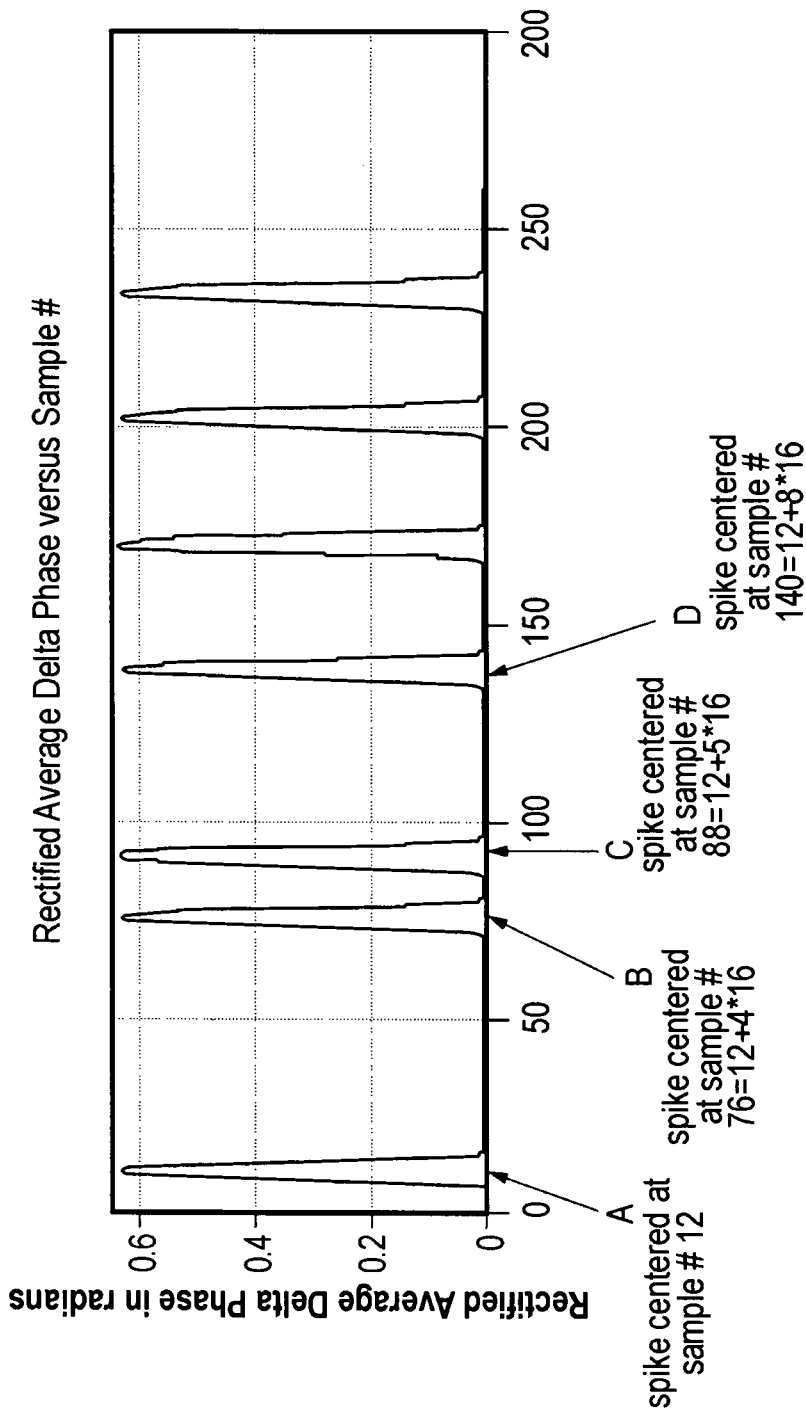
FIG. 3 is a plot of rectified average delta phase versus sample number for the binary PSK signal of FIG. 2 according to one exemplary embodiment of the disclosed methods and systems.

Referring to processing of a PSK signal, the unwrapped phase data of FIG. 2 may be first differentiated, followed by a DC removal, and then followed by a rectification (i.e., all negative value data spikes changed to positive value data spikes) to yield the rectified average delta phase data plot of FIG. 3, in which the series of data spikes in FIG. 3 each correspond to one of the series of level changes in FIG. 2. In an alternative embodiment, the process of differentiation and unwrapping may be computed almost simultaneously. The average delta phase d at an instance is the average of m delta phases centered at that instance, where m is arbitrary. A delta phase is the difference of the preceding phase p from the present phase value p. If p(t1) represents a phase value at time t1, and d(t2) represents the average delta phase at time t2, then at t2=0, we have for m=4:

$$d(0)=\{p(2)-p(1)+p(1)-p(0)+p(0)-p(1)+p(-1)-p(-2)\}/4; \text{ or } d(0)=\{p(2)-p(-2)\}/4 \quad \text{(Equation 1)}$$

The average delta phase d is a measure of slope and is one way of manifesting PSK signal phase transitions that may be employed in the practice of one exemplary embodiment of the disclosed methods and systems. However, it will be understood that any other suitable methodology may be employed to detect PSK signal phase transitions, e.g., using Radon transform methodology as described in U.S. Pat. No. 7,590, 209 issued Sep. 15, 2009, which is incorporated herein by reference.

For a PSK signal, each of the data spikes of rectified average delta phase data of FIG. 3 corresponds to a phase change. In the case of a FSK signal, the unwrapped phase data may be first differentiated to obtain a differentiated unwrapped phase plot which then itself may be differentiated, and then followed by a rectification to yield a rectified average delta frequency data plot containing a series of data spikes that each correspond to a frequency change. In the case of a FMCW signal, the unwrapped phase data may be first double-differentiated to obtain a double-differentiated unwrapped phase plot which then itself may be differentiated, and then followed by a rectification to yield a rectified average delta frequency slope data plot containing a series of data spikes that each correspond to a frequency slope change. The general term "rectified average delta" is used herein in reference to one or more of three signal type cases presented herein (i.e., PSK, FSK and FMCW signal processing). In this regard, the general term "rectified average delta" is used to refer to each of rectified average delta phase, rectified average delta frequency, and/or rectified average delta frequency slope.

Figure 4A:
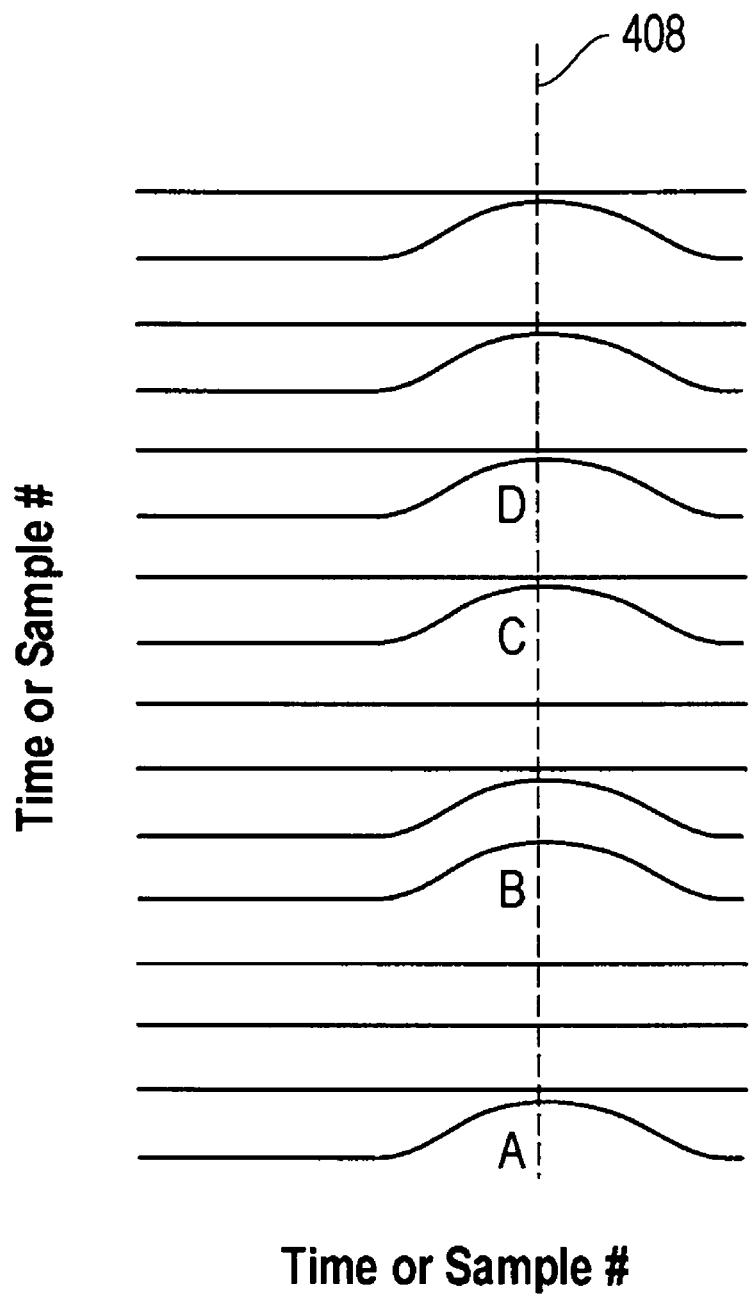
FIG. 4A is a time-time plot of data for the binary PSK signal of FIGS. 2 and 3 according to one exemplary embodiment of the disclosed methods and systems.

Still referring to the rectified average delta phase data of FIG. 3, the rectified average delta phase data spikes are separated at multiples of the element length, which in this exemplary embodiment is equal to 16 as shown. FIG. 4A is a time-time plot of the data of FIG. 3, in which each trace has a wrap around length that equals the element length or minimum interval (i.e., the reciprocal of the baud) of the PSK signal, which is 16 for this exemplary embodiment. In this regard, the most bottom trace of FIG. 4A is formed from the first 16 samples (samples 1 to 16) of FIG. 3, the second bottom trace is formed from the second 16 samples (samples 17 to 32) of FIG. 3, and so on. To form the time-time plot of FIG. 4A, the rectified average delta phase data of FIG. 3 is used to fill a 2-D array, TT(i,j), to form the time-time plot of FIG. 4A. Thus d(1), . . . , d(n) would fill the first row of TT, and TT(2, 1)=d(n+1), . . . d(2n) would fill the second row of TT, etc. The value n is an integer and controls the instance of wrap around and is also called the wrap around length (WrapLen). This value, n, is approximately equal to, or is approximately some multiple, k, of, the element length which is defined as the minimum phase transition interval. Ideally, k should be as small as possible so as to allow more traces being formed and added together, thus enhancing a greater chance of detection. However, when k is a value other than 1, a group pattern may be revealed.

As will be described further herein, an initial coarse estimate of the wrap around length (e.g., which is equal to 16 for the embodiment of FIG. 4A) may be obtained in one exemplary embodiment from fast Fourier transform (FFT) spectrum of the rectified average delta phase data. From this initial coarse estimate, a Radon sum routine may be performed to arrive at a more accurate value of the minimum interval by comparing results at various slope.

As shown in FIG. 4A, when the wrap around length is exactly equal to the element length for a particular signal data being processed, the data spikes line up vertically (i.e., see data spikes A, B, C and D of FIGS. 3 and 4). Therefore, when all the traces of FIG. 4A are summed together vertically along dashed line 408, the result is a large spike at sample 12, as shown in FIG. 5. In this regard, FIG. 5 is a Radon sum that represents a substantially vertical sum across the rows of each of the individual 16-sample columns of a corresponding time-time plot of FIG. 4A. The well-defined peak Radon sum peak of FIG. 5 indicates that a signal has been detected, and the element length (inverse of baud) is given by the computed trueWrapLen of the plot of FIG. 5. In general, the Radon sum plot depicts much cleaner signals than the rectified average delta (compare FIG. 11 to FIG. 9) and may be used in the practice of the disclosed methods and systems to more readily calculate the element length and the time instances where phase changes are likely to occur in a manner. Advantageously the disclosed methodology is robust enough so that even if the phases are unwrapped in the wrong direction (in the phase transition region), the final results are unaffected. It should be noted that FIG. 5 represents a Radon sum taken from a time-time plot of data that includes an entire set of 3000 samples of rectified average delta phase, whereas FIGS. 2 through 4A illustrate data from the first 256 samples for ease of illustration.

The time-time plot, besides being elucidative in explaining the computation of a maximum sum, may also be used as a distinctive display capable of indicating the presence of a signal to the human eye. Computationally, the Radon sum may be obtained by adding successive data spikes spaced at a distance D apart, where D may be varied (over a range.) Varying D is equivalent to varying the slope of the line along which the Radon sum is computed. In FIG. 5, the trueWrapLen is the distance D when the best Radon sum is obtained. Thus, in FIG. 5, the trueWrapLen is a refinement of the initial coarse estimate of the element length. The Radon sum computation for a particular exemplary D is depicted in the Matlab codes below:

```
% inputSignal = rectified average delta
% lenData = length of inputSignal
% n = wrap around length and is the nearest integer to the initial element
length estimate
% shiftPR = shift per row, +ve towards right. Usually fractional value.
function radonSum = quickRadon( inputSignal,lenData,n,shiftPR )
radonSum = zeros( n,1 );
D = n + shiftPR;
for ix=1:n
   offset = ix;
   k = ix;
   while k<=lenData
      radonSum( ix ) = radonSum( ix ) + inputSignal( k );
      offset = offset + D;
      k = floor( offset );
   end
end
```

Notice that even if offset is usually a non-integer, it is not necessary to use interpolated values, i.e., the rectified average delta may not be interpolated in one exemplary embodiment, although interpolation may be used in another embodiment as described in U.S. Pat. No. 7,590,209 issued Sep. 15, 2009, which is incorporated herein by reference. This is to allow speed of computation and has been found to work satisfactorily. When shiftPR=0, this is equivalent to summing vertically on the time-time plot.

If the inputSignal time series had been rotated right (towards increasing time) by s samples, where the final s samples is rotated into the initial s samples, the new Radon sum time series would likewise have been rotated right by an amount equal to s samples, where the original (unshifted) final segment of s samples would be rotated into the initial segment of s samples. This understanding is helpful during searching for a more exact location of Radon sum peak by interpolation when the peak occurs at the vicinity of the start or end of the Radon sum time series. In which case, interpolation may wrap around the time series if necessary.

The Tau-p transform is a form of Radon transform and is used to transform a 2-D seismic image to a 2-D Tau-p section, where p stands for inverse of slope. The Tau-p transform may also be applied to the time-time plot to obtain the corresponding Tau-p section where the Radon sum series would be equivalent to a sum of all values repeated at intervals tau=trueWrapLen and at the best p. The Tau-p transform is discussed in R. H. Tatham, *Multidimensional Filtering of Seismic Data*, Proc. IEEE, 1984, pp. 1357-1369, which is incorporated herein by reference.

Another distinct but suitable approach that may be employed in one exemplary embodiment is the Hough transform which maps the contribution (according to slope) of each point in the time-time plot to the Radon sum series. In this regard, the Hough transform is discussed in M. van Ginkel, C. L. Luengo Hendriks, and L. J. van Vliet, *A Short Introduction to the Radon and Hough Transforms and How They Relate to Each Other*, Technical Report QI-2004-01, Quantitative Imaging Group, Delft University of Technology, February 2004, 1-11, which is incorporated herein by reference.

It will be understood that as long as the element length is an integer and the wrap-around length, n, is selected to be equal to the element length, or to be a multiple of the element length (e.g., two times the element length), data spikes of a high amplitude event will line up vertically in a time-time plot. Even in those cases where n deviates somewhat/fractionally from a multiple of the element length, data spikes of a high amplitude event will line up in a sloped manner in a time-time plot, as indicated by dashed line 410 for the exemplary time-time plot of FIG. 4B. In such a case, a Radon transform may be used to sum all the traces of FIG. 4B together along the sloped line of data spikes indicated by dashed line 410 to result in a large spike similar to that shown in FIG. 5. Therefore, using the disclosed methods and systems, high amplitude events in the time-time plot may be processed to line up in a straight line on a time-time plot, albeit a vertical or sloped line, so that the disclosed methodology may be successfully applied using a Radon transform operation even without an accurate initial estimate of the element length, e.g., when there is an inaccuracy in estimating the exact element length.

Figure 4B:
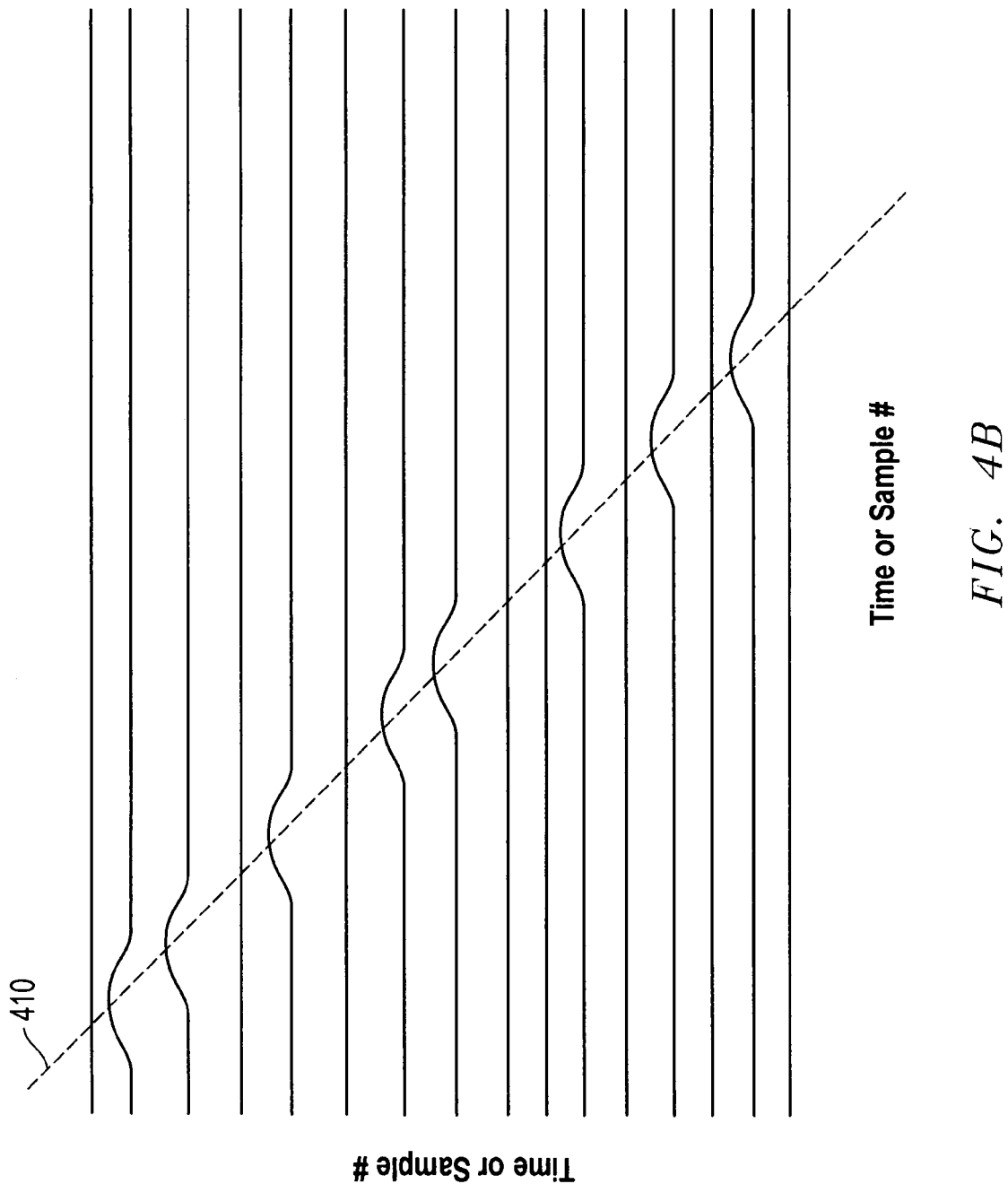
FIG. 4B is a time-time plot of data for a binary PSK signal according to one exemplary embodiment of the disclosed methods and systems.
Figure 5:
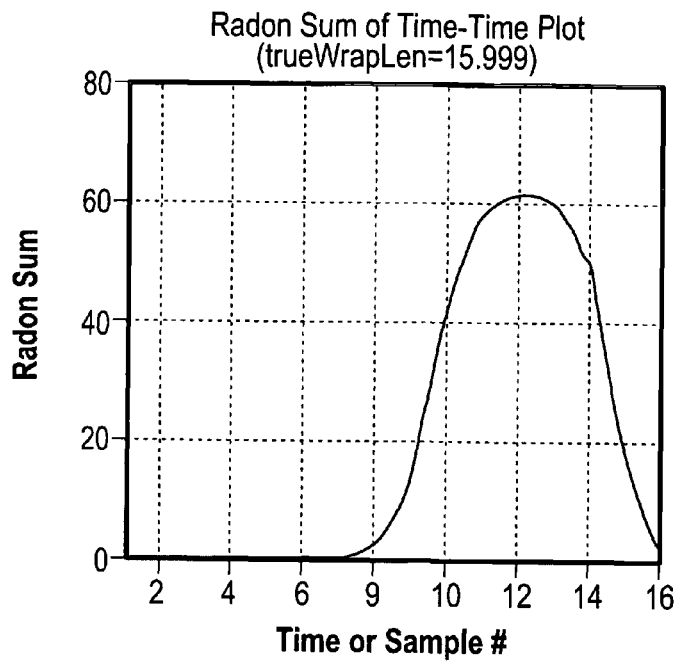
FIG. 5 is a Radon sum plot of the time-time plot data of FIG. 4A according to one exemplary embodiment of the disclosed methods and systems.

With regard to the exemplary embodiments of FIGS. 4A and 4B, noise is random in nature and will not tend to line up in a straight line in a time-time plot whereas the high amplitude events of phase changes (e.g., of a PSK signal) tend to form a straight line. These high amplitude events sum to a relatively large value in the Radon sum of FIG. 4A along lines parallel to the vertical. In FIG. 4B, the Radon sums occur optimally along lines having a slope relative to the vertical. For the exemplary embodiments of FIGS. 4A and 4B, Radon summing continues as the line wraps around from the right side to the left side until the top of the respective time-time plot is reached. The optimal slope to sum the event may be computed, for example, by iterating through a range of slopes. Further processing, such as using the steepest descend method, may be used to accelerate the search process.

Figure 6:
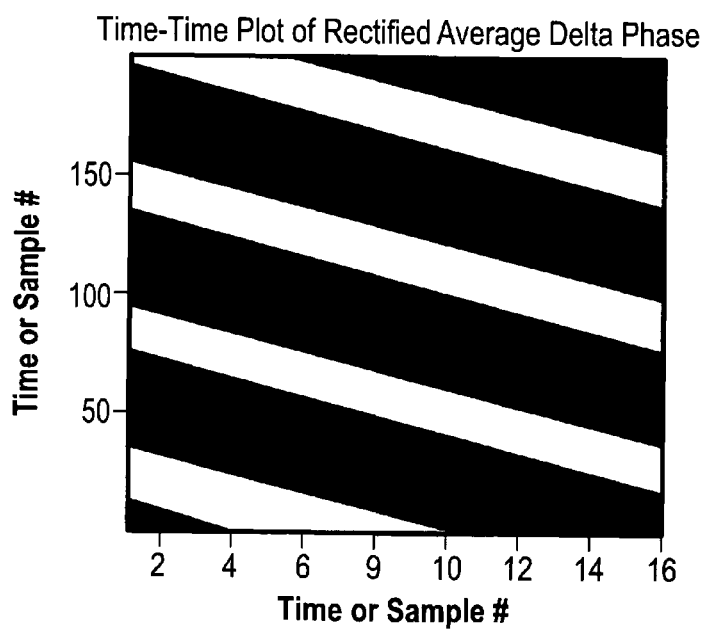
FIG. 6 is a time-time plot of data for the binary PSK signal according to one exemplary embodiment of the disclosed methods and systems.
Figure 7:
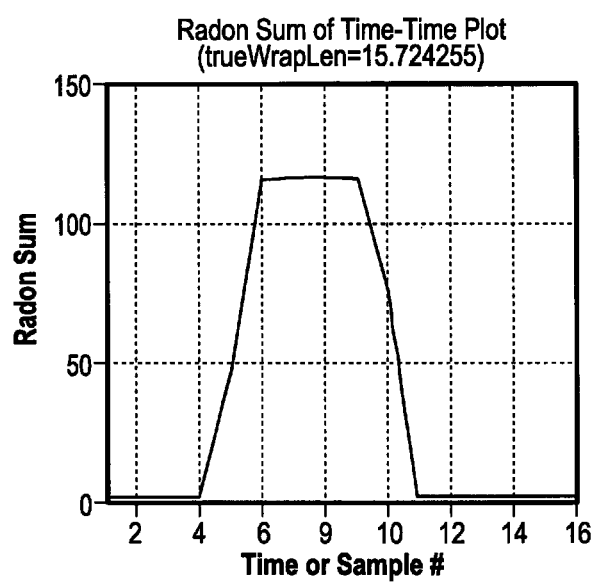
FIG. 7 is a Radon sum plot of the time-time plot data of FIG. 6 according to one exemplary embodiment of the disclosed methods and systems.

As previously described, high amplitude events in a time-time plot of a signal may sometimes lie along a straight line with a slope, meaning that the line of high amplitude events may not always be vertical. In such a non-vertical case, a Radon sum may be taken along the appropriate slope to reveal repetitive synchronized signal events of the signal. FIG. 6 is a time-time plot of data from a PSK signal of another exemplary embodiment in which high amplitude events lie along a straight line having a slope. In the embodiment of FIG. 6, the minimum interval is computed to be 15.7 and is not equal to an integer number, meaning that the line of high amplitude events is not vertical. In such an embodiment, a Radon sum along an appropriate slope of FIG. 6 reveals the signal, as shown by the Radon sum plot of FIG. 7, which is taken from the data of FIG. 6.

Within a dwell, depending on the minimum interval, there may be many data spikes pertaining to the event changes (or phase transitions in a PSK signal). In one embodiment of the practice of the disclosed methods and systems, these data spikes may be appropriately added in-phase by a Radon sum technique yielding a re-enforced Radon sum peak. These data spikes may be added in-phase because they occur at instances that are multiples of the minimum interval, and because the data spikes are processed so that they are always positive. In this exemplary embodiment, re-enforcement of the signal is possible, even if the data bits are random, because the rectified average delta is used rather than the non-rectified average delta or the unwrapped phase which may result in cancellation of good signals instead of desired re-enforcement. In the practice of this embodiment, a peak occurs in the corresponding Radon sum plot when the sum is taken on consecutive elements that are spaced a minimum interval apart. In one exemplary embodiment, an improvement in SNR of $\sqrt{N_1}$ may be realized, where $N_1$ is the number of the data spikes due to phase transitions. Even though the raw signal data may be noisy and contain false spikes, these spikes, being random in nature, do not line up to result in a re-enforced Radon sum peak.

In one exemplary embodiment, multiple dwells of the rectified average delta may be added in-phase to result in a further re-enforcement of relevant signals. This is possible, for example, when the start time of each dwell is available (e.g., available from the dwell header and provided by the timing circuit of the receiver which may be configured to log the start time at the start of sampling), allowing a determination of how much to shift one dwell with respect to another before adding. In-phased addition of multiple dwells of rectified average delta data results in an improvement in SNR of $\sqrt{N_2}$, where $N_2$ is the number of dwells, resulting in a total improvement to SNR that is $\sqrt{(N_1 N_2)}$. As an example, consider a total 3000 sample data set for a binary PSK signal with a minimum interval of 2 µs, and assuming (the optimum case of) a fixed data pattern of alternate 0's and 1's. Such a case results in a spike in the rectified average delta every 16 samples (after decimation and filtering). This translates to a value of $N_1=3000/16=187$, and a value of $N_2=4$ dwells that are summed for computation of the Radon sum to derive the minimum interval. In this case, $\sqrt{(N_1 N_2)}=27.3$, which is 14.4 db of improvement in SNR.

In one exemplary embodiment, the following equations represent the in-phase addition together of multiple dwells of rectified average delta data to result in a further re-enforcement of relevant signals when a time delay (a) that is less than $N*\Delta t$; where N is the cyclical FFT size (number of samples used in the FFT), and $\Delta t$ is the sampling time interval:

Let: $d_1(t)$=rectified average delta of dwell 1=f(t); and
$d_2(t)$=rectified average delta of dwell 2=f(t+a) (time lag of a)
Then: $D_1(w)=FT(d_1)=F(w)$;
$D_2(w)=FT(d_2)=e^{iwa}F(w)$; and
$F(w)=e^{-iwa}D_2(w)$ And the information in dwell 1 and dwell 2 should add in phase via the following sum:

$$D_1(w)+e^{-iwa}D_2(w)=s$$

As described elsewhere herein, the rectified average delta from signal data are summed. Rectified average delta transforms abrupt phase change events into positive spikes for a PSK signal. For a PSK signal with a given baud, phase transitions may seem to occur at random if the data bits are random. However whenever phase transitions occur, they are also expected to occur at discrete instances of time which are in multiples of the element length. Therefore, the disclosed methods and systems may be implemented in one exemplary embodiment so that an in phase sum of several dwells of rectified average delta produces a series of re-enforced spikes at repetitive instances of the element length. The rectified average delta is an example of the more general class of reinforceable repetitive synchronous data, $\Delta\Phi$. As will be described further herein, other examples of reinforceable repetitive synchronous data include, but are not limited to, envelope data.

Figure 8:
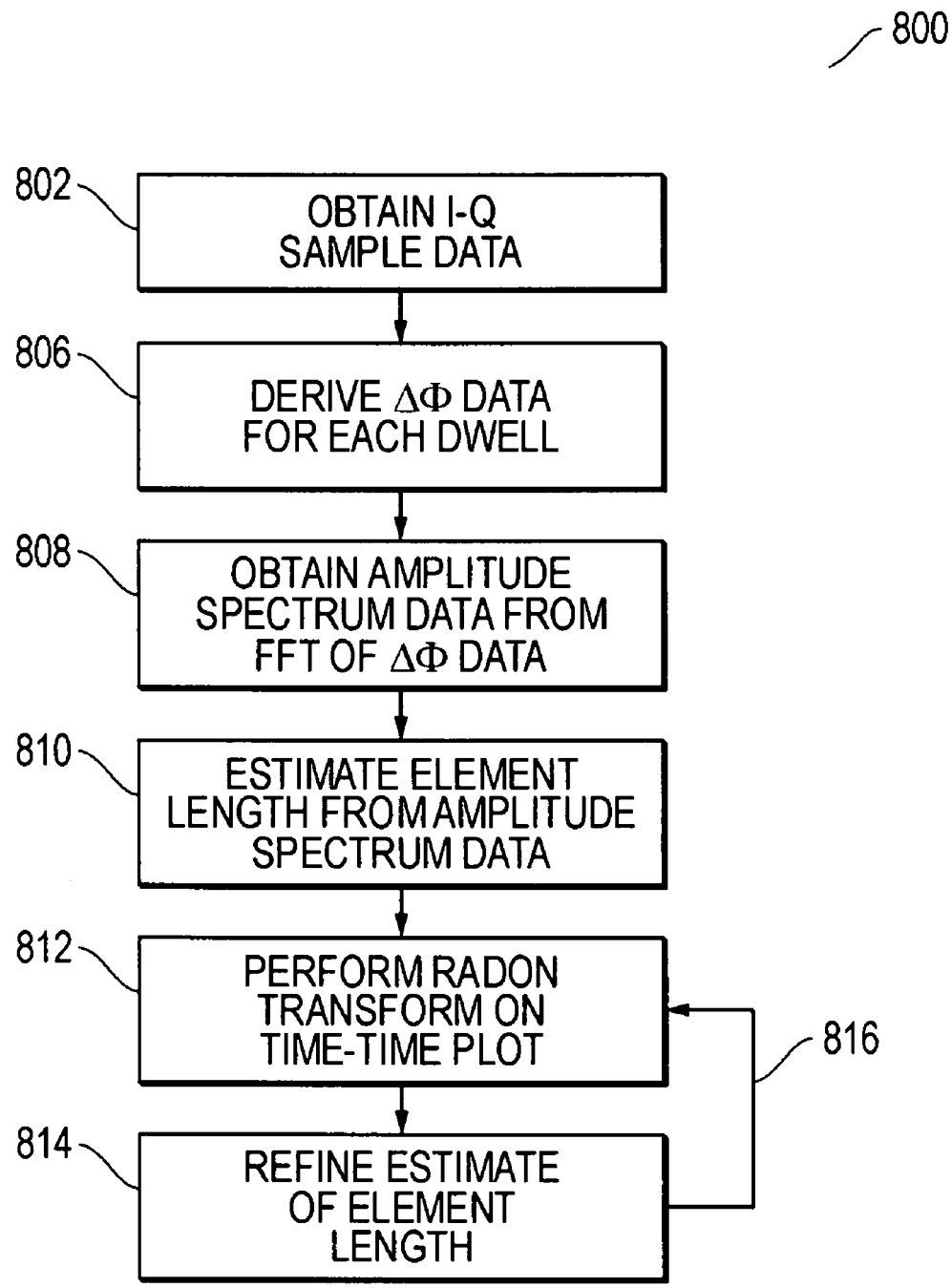
FIG. 8 illustrates methodology as it may be implemented according to one exemplary embodiment of the disclosed methods and systems.

FIG. 8 illustrates methodology 800 that may be implemented according to one exemplary embodiment of the disclosed methods and systems to detect a repetitive synchronized signal event and to optionally determine element length of a signal, e.g., PSK, FSK or FMCW signal. In one embodiment, methodology 800 may be performed in real-time to process received raw signal data (e.g., received raw data signal 104) and may be repeated in real time as often as needed or desired to meet the requirements of a given signal processing application. Exemplary steps for processing of I-Q samples in step 806 to obtain the desired transform reinforceable repetitive synchronous data, $\Delta\Phi$, may be characterized as follows for each of PSK, FSK and FMCW signals.

For a PSK signal, rawPhase=arctan(Q/I), and unwrappedPhase=unwrap(rawPhase). The unwrappedPhase is differentiated (or deltas are taken), DC component is removed, and negative spikes reversed to positive, which results in the desired transform $\Delta\Phi$ (i.e., rectified average delta phase).

For a FSK signal, theta=arctan(Q/I), unwrappedTheta=unwrap(theta), and unwrappedTheta is then differentiated (or deltas are taken) to give freqLevels. The freqLevels is differentiated (or deltas are taken), and negative spikes reversed to positive, which results in the desired transform $\Delta\Phi$ (i.e., rectified average delta frequency). The differentiation of the differentiated unwrapped phase (freqLevels) for FSK may alternatively be replaced with a level change detection routine, which takes the sum of k preceding samples and subtract it from the sum of k subsequent samples. The distance between the group of k preceding samples and the group of k subsequent samples may also vary. The result of the level change routine may then be scaled and may also be rectified to yield the rectified average delta frequency.

Alternatively, for a FSK signal, the I and Q time series may be differentiated to yield the corresponding dI and dQ. From these, the envelope=$+\sqrt{(dI^2+dQ^2)}$ may be derived, where the envelope is the frequency time series consisting of the frequency levels of the FSK signal plus a DC component. A differentiation or a level change detection routine may be applied to this envelope and followed by a rectification to yield ΔΦ. This alternative FSK signal method is advantageous in that it eliminates the need to compute arctan(Q/I), which is more computationally intensive and tends to introduce additional noise although it may be employed in other embodiments.

For a FMCW signal, theta=arctan(Q/I), unwrappedTheta=unwrap(theta), and unwrappedTheta is then differentiated (or deltas are taken) to give freq, which is then differentiated (or deltas are taken on freq) to give freqSlopes. The freqSlopes is differentiated (or deltas are taken), and negative spikes reversed to positive, which results in the desired transform ΔΦ (i.e., rectified average delta frequency slope). Alternatively, the differentiated unwrapped phase (freq) for FMCW may be processed by a frequency peak detection routine which transforms frequency peaks into positive data spikes to yield the rectified average delta frequency slope, except that in this case (if the trough in frequency is ignored) the data spike only corresponds to a change from positive frequency slope to negative frequency slope but not the reverse. Such a frequency peak detection routine looks for localized maximum in the frequency time series (the differentiated unwrapped phase) and places a positive data spike corresponding to the location of maximum, and a value of zero elsewhere. For this method, the computed trueWrapLen corresponds to the period that is a sum of the rise time (rising frequency segment) and the fall time (falling frequency segment). With the former method, the computed trueWrapLen corresponds to the shorter of the rise time or fall time. With the former method, if alternate spikes (or spikes of the same sign before rectification) are used only, the computed trueWrapLen also corresponds to the sum of the rise time and fall time. Therefore, in both cases, the element length of FMCW, which is defined here as the sum of the rise and fall time, may be deduced.

Alternatively, for a FMCW signal, Kalman filter may be applied directly to the I-Q samples to obtain the frequency. The frequency peak detection routine may then be applied to give ΔΦ. In another alternative for a FMCW signal, an envelope may be computed in a similar manner to the FSK signal. This envelope gives the frequency time series plus a DC offset. This frequency time series may then be input into the frequency peak detection routine to yield ΔΦ. Again, this method may be advantageously implemented without the arctan(Q/I) computation, which is also embedded in the above Kalman filter method.

Figure 17:
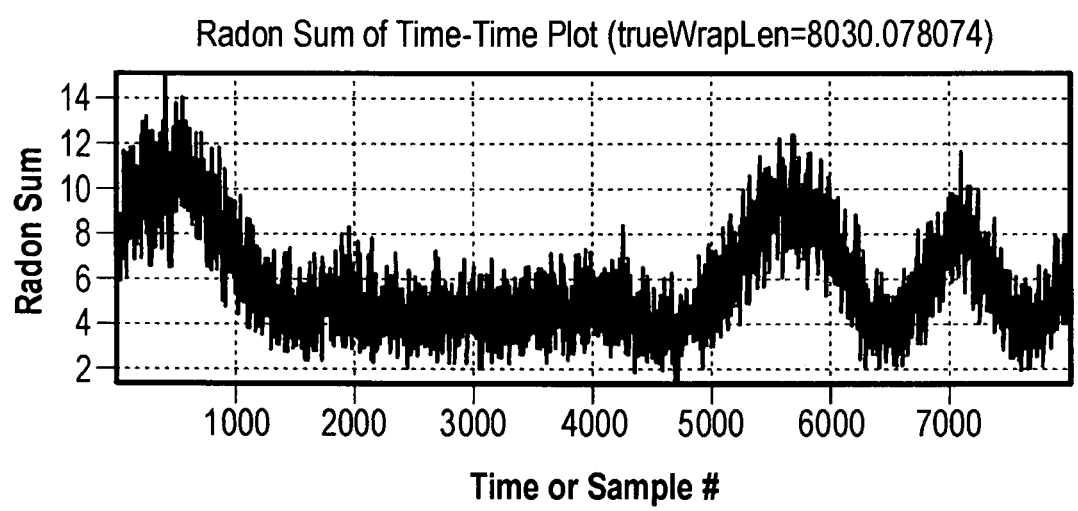
FIG. 17 is a Radon sum plot according to one exemplary embodiment of the disclosed methods and systems.

In contrast to data communication signal, the envelope of a radar signal used for detection may not always correspond to random data bits and may instead include a repeatable group pattern. Where no random patterns are involved, the envelope may be used in place of the rectified average delta as an input to the time-time plot Radon transform method to compute for the group element length and minimum interval. For FMCW and FSK signals, the envelope are as derived above. For PSK, the envelope is the unwrapped phase of a finely tuned PSK signal or is the unwrapped phase of a coarsely tuned PSK signal with the average slope removed (e.g, such that the signal in FIG. 2 is rotated to the horizontal). These envelopes are yet other examples of reinforceable repetitive synchronous data, ΔΦ. In such an embodiment, the Radon sums of these envelopes result in higher SNR envelopes from which conventional techniques may be applied to extract one or more characteristics of the signals. For example, FIG. 17 shows a Scout FMCW signal at SNR=−10 db at 32 MHz bandwidth, where the Radon sum is obtained from the envelope (which consists of 52436 samples) and depicts a group pattern. From the Radon sum of FIG. 17, conventional techniques such as Kalman filter followed by a frequency peak detection routine may be applied to extract the minimum interval, and the frequency rise and fall slopes.

Figure 9:
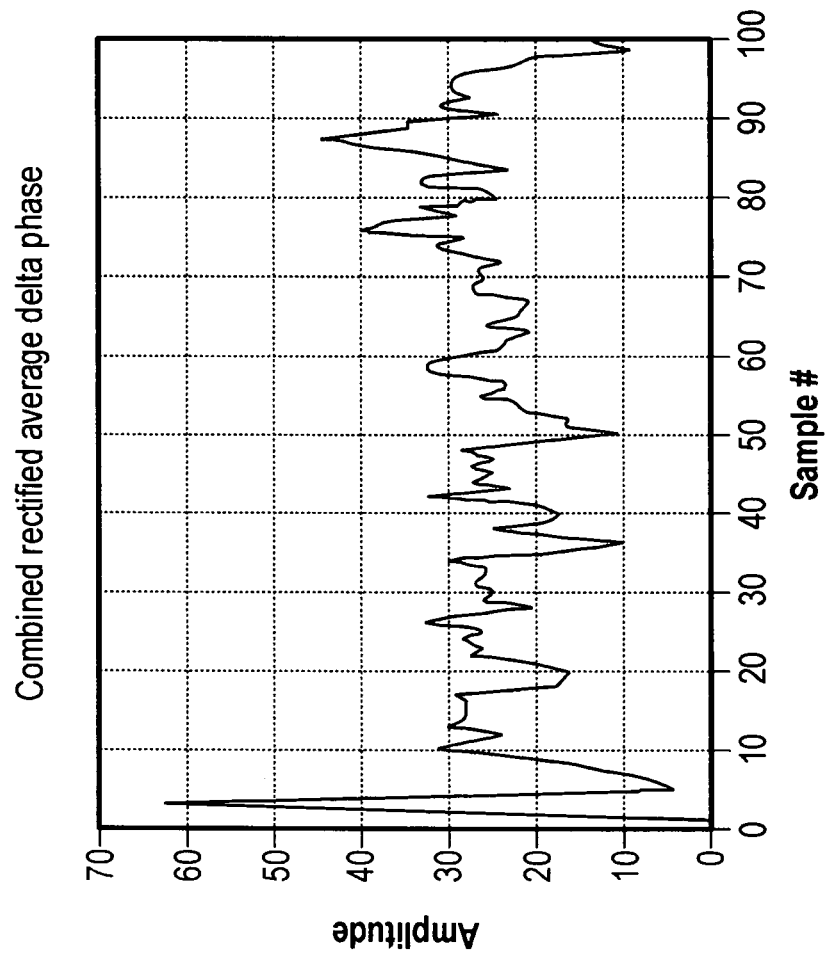
FIG. 9 is a plot of an initial portion of combined rectified average delta phase versus sample number for multiple dwells according to one exemplary embodiment of the disclosed methods and systems.

Still referring to step 806 of FIG. 8, it will be understood that several dwells of ΔΦ may be summed in phase at this time. In this regard, FIG. 9 shows a coherent (in-phase) sum of 400 dwells of rectified average delta phase for an exemplary simulated case involving a PSK signal having a SNR of −18 db at 32 MHz bandwidth. FIG. 9 shows the first 100 of a total of 3000 samples (spanning a time of 12.5 μs being shown).

Figure 10:
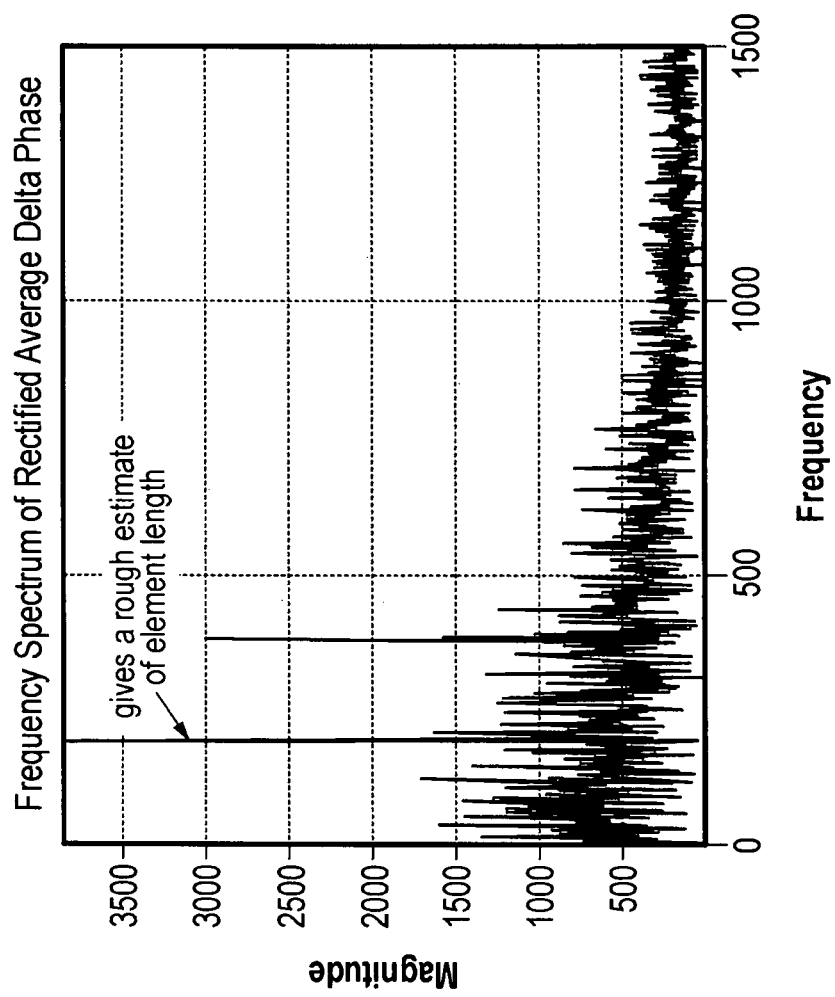
FIG. 10 is a plot of frequency spectrum obtained by FFT processing of the combined rectified average delta phase data of FIG. 9 according to one exemplary embodiment of the disclosed methods and systems.

Next, FFT processing is applied in step 808 to ΔΦ of step 806 and amplitude spectrum data is obtained from the FFT results. FIG. 10 shows amplitude spectrum data (for the 3000 total samples) obtained by FFT processing of the rectified average delta for the exemplary data of FIG. 9. In step 810, an initial estimate of the element length is obtained from the amplitude spectrum data of step 808. As shown in FIG. 10, the highest energy spike nearest to (but not at) the zero frequency sample may be used to give an initial estimate of the element length, 1/f, of the PSK signal, where f is the frequency of the highest energy spike nearest to but not at zero frequency. A more exact f may be determined by interpolation as follows: 1) A curve is formed from the energy (amplitude square) values across three consecutive bins, where the mid bin contains the highest energy spike. 2) The frequency value at which the energy value of the interpolated curve is maximum gives the more exact f.

Figure 11:
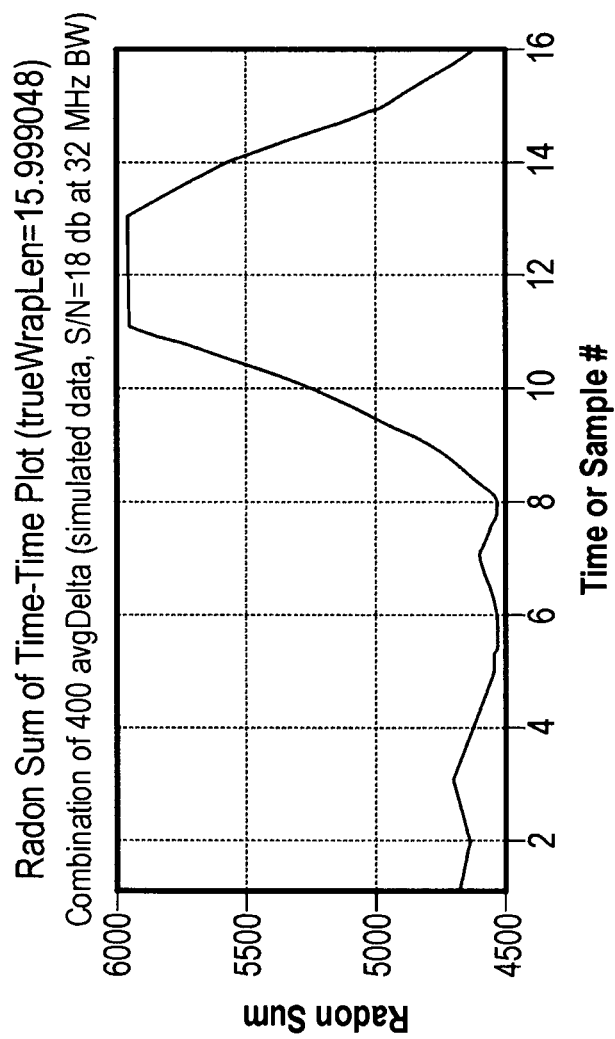
FIG. 11 is a Radon sum plot pertaining to the signal of FIGS. 9 and 10 according to one exemplary embodiment of the disclosed methods and systems.

For the exemplary data of FIG. 10, the initial estimate of element length may be determined to be 15.999268. From the initial estimate of the element length obtained in step 810, a time-time-plot-Radon transform of FIG. 11 is derived in step 812, and then a refined revised estimate of the element length obtained in step 814 from the data of FIG. 11. In this regard, presence of a single definitive peak obtained in the time-time plot Radon sum of step 812 is sufficient to confirm the presence of a signal and to confirm the estimate of element length. FIG. 11 illustrates just such a case, where the element length is confirmed to be 16 samples. As desired or necessary, steps 812 to 814 may be iteratively performed as shown by arrow 816 until a sufficiently definitive Radon sum peak is obtained in step 814 to confirm the presence of a signal and to confirm the estimate of element length.

Still referring to FIG. 10, the iteration 816 may also be performed over several amplitude spectrum peaks resulting in several Radon sum series. The best Radon sum series may be selected based on factors such as the number of peaks, the well-defined nature of the peaks, etc. Ideally, a Radon sum series results that has only one peak gives the true element length (by its trueWrapLen). However, if multiple well-defined Radon sum peaks are obtained the Radon sum series may reveal a group pattern, and the element length is the distance between the two peaks that are spaced closest to one another. Results of several Radon sum series may also be compared to confirm the correctness of conclusion.

It will be understood that the order and methodology of the steps of FIG. 8 is exemplary only and that any other combination of additional, fewer and/or alternative steps may be employed using the Radon sum of a time-time plot (or other suitable type of in-phase sum of time-time data) that is suitable for recognizing or detecting a repetitive synchronized event contained in raw signal data, identifying the signal type/s, and/or computing element length of a detected repetitive synchronized event. Furthermore, it will be understood that any combination of additional, fewer and/or alternative steps may be employed to provide or otherwise generate an in-phase sum (e.g., Radon sum) of time-time data for at least one of display, storage, or further processing, regardless of the source of this data (i.e., received signal data or not). More information on Radon sum processing may be found, for example, in M. van Ginkel, C. L. Luengo Hendriks, and L. J. van Vliet, *A Short Introduction to the Radon and Hough Transforms and How They Relate to Each Other*, Technical Report QI-2004-01, Quantitative Imaging Group, Delft University of Technology, February 2004, 1-11, which is incorporated herein by reference. Further, it will be understood that the methodology of step 812 is exemplary only, and that any other techniques other than Radon sum methodology may be employed that is suitable for adding time-time data in phase across multiple data traces to obtain a sum of time-time data.

As disclosed herein, Radon sum of time-time plots of rectified average delta data may be utilized to identify the initial time instances from whence subsequent event changes (e.g., phase transitions, frequency slope changes) may be located or approximately located. In one exemplary embodiment, this may be employed to enable focusing of re-computation around narrower regions of the data using different methods. For example, the methodology of U.S. Pat. No. 7,590,209 issued Sep. 15, 2009, (which has been incorporated herein by reference) may be employed to further reduce or eliminate potential for false recognition of event changes, or to identify a more exact location of the event changes, or to identify other events in the signal data. Furthermore, in another exemplary embodiment, methodology of steps 806 through 812 may be performed to "screen" raw signal data for presence of one or more particular types of signal (e.g., PSK signal, FSK signal, FMCW signal, etc.), for example, prior to further appropriate processing of the identified particular type of signal. For example, the processing performed in step 806 may be performed to process I-Q samples in a manner that is targeted to identifying the presence of one particular type of signal of interest (e.g., PSK signal, FSK signal, FMCW signal, etc.), or may be performed using successive processing steps or simultaneous processing steps each targeted to identifying the presence of a particular different type of signal of interest. In either case, detection of a repetitive synchronous signal event during the signal processing that is targeted to a particular signal of interest indicates the presence of that particular type of signal in the raw signal data.

Figure 12A:
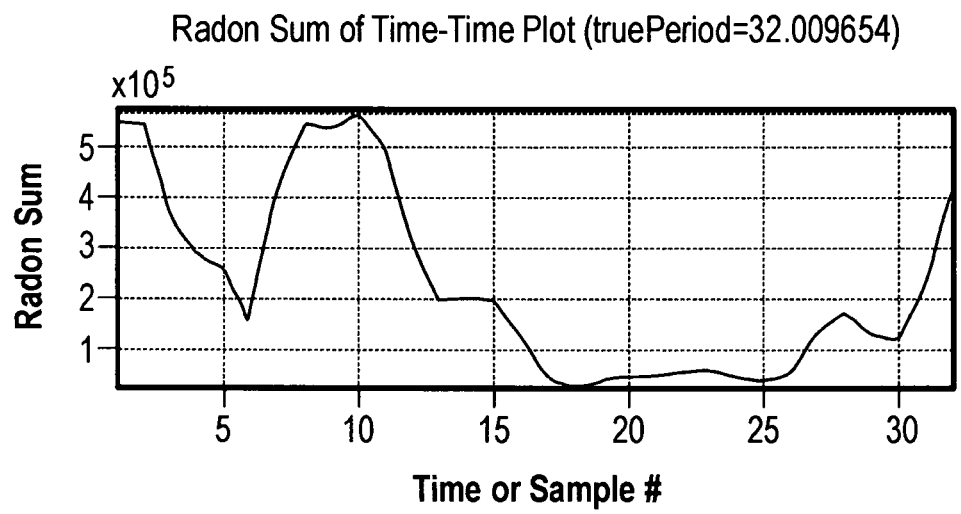
FIG. 12A is a Radon sum plot according to one exemplary embodiment of the disclosed methods and systems.

FIG. 12A illustrates another example of time-time-plot-Radon transform obtained in step 812 using an initial estimate of element length (i.e., 32.13) from the strongest interpolated peak of amplitude spectrum data obtained in step 810 from FFT processing of a different PSK signal from FIGS. 10 and 11. FIG. 12A shows the trueWrapLen of 32 which may be taken as the more likely value of the (group) element length and illustrates the better accuracy achieved by the Radon transform compared to that obtained from the FFT amplitude spectrum (especially when the spectrum consists of a small number of samples). As shown in FIG. 12A, multiple peaks (two peaks in this case) are present as a repeatable group pattern in the time-time-plot-Radon transform, indicating that the actual element length is smaller than the initial estimate of step 810 rather than the larger group interval estimate derived from FFT spectrum. In such a case, the distance between two closest peaks of the repeatable group pattern may be used in step 814 to determine a refined estimate of element length. However, a more exact location of a Radon sum peak may be found by interpolation as follows: 1) A curve is formed from the Radon sum values across three consecutive bins, where the mid bin contains peak Radon sum. 2) The sample value at which the Radon sum of the interpolated curve is maximum gives the more exact location of the Radon sum peak. When the peak is located near the start or end of the Radon sum time series, the three consecutive bin may wrap around the time series appropriately as discussed previously.

Figure 12B:
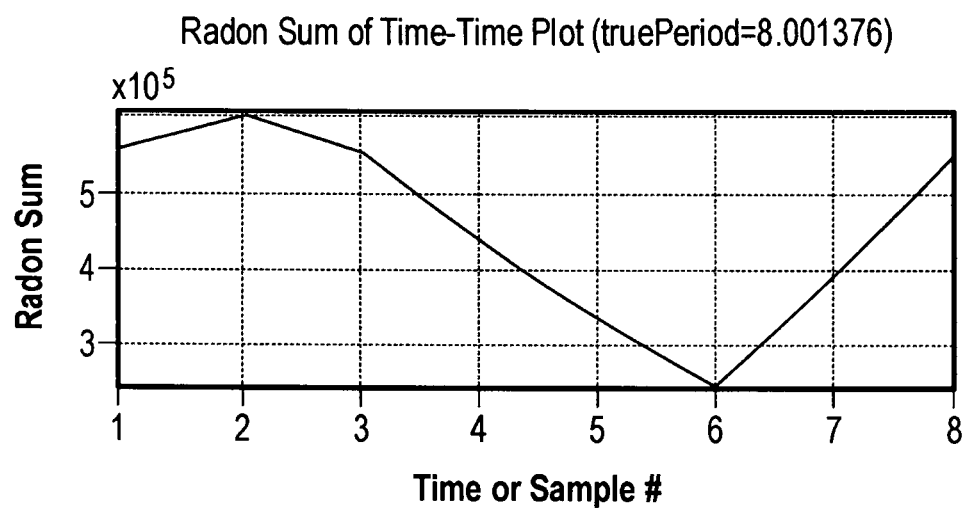
FIG. 12B is a refined Radon sum plot based on the Radon sum plot of FIG. 12A according to one exemplary embodiment of the disclosed methods and systems.

In the example of FIG. 12A, the distance between the two closest peaks is 8 samples. This distance may then be taken as an initial guess of element length and input into the Radon transform routine again, which produces FIG. 12B. FIG. 12B indicates that the refined element length is indeed 8 samples because there is one well-defined peak. Thus, details of a larger repetitive pattern (spanning several element lengths) may be revealed by a time-time-plot-Radon-transform using $\Delta\Phi$, even when details of the pattern are not readily interpreted using the FFT spectrum alone. A comparison of FIG. 10 to FIG. 11 shows that the time-time-plot-Radon-transform of FIG. 11 yields a much cleaner visual presentation of the presence of element length than the FFT amplitude spectrum plot of FIG. 10. In this regard, FIG. 10 appears noisy in comparison to FIG. 11 which clearly shows the presence of the element length. Moreover, a time-time-plot-Radon-transform may be obtained in one exemplary embodiment in a manner that is computationally very fast, and without the need to interpolate the $\Delta\Phi$ values. When element length deviates from an integral number of samples, a slope in the high amplitude events is yielded in a time-time plot. However, the presence of this slope may be readily revealed by a time-time-plot Radon transform in a manner that relates very accurately to the deviation from the integral number.

In frequency domain, the time shift corresponds to a phase shift. In certain embodiments it may be also desirable to work with the frequency spectrum, e.g., to add the frequency spectrums of several dwells. This process may be become complicated in some cases if a successive dwell is delayed too long, e.g., by a time delay (a) that is greater than $N*\Delta t$, where N is the FFT length, and $\Delta t$ is the sampling interval. However, in embodiments where it is possible to acquire a long continuous dwell, a large value of $N_1$ (i.e., number of phase transition data spikes) may be determined. This large number of samples may be used to recognize or detect a repetitive synchronized event contained in raw signal data under low SNR conditions.

Figure 13:
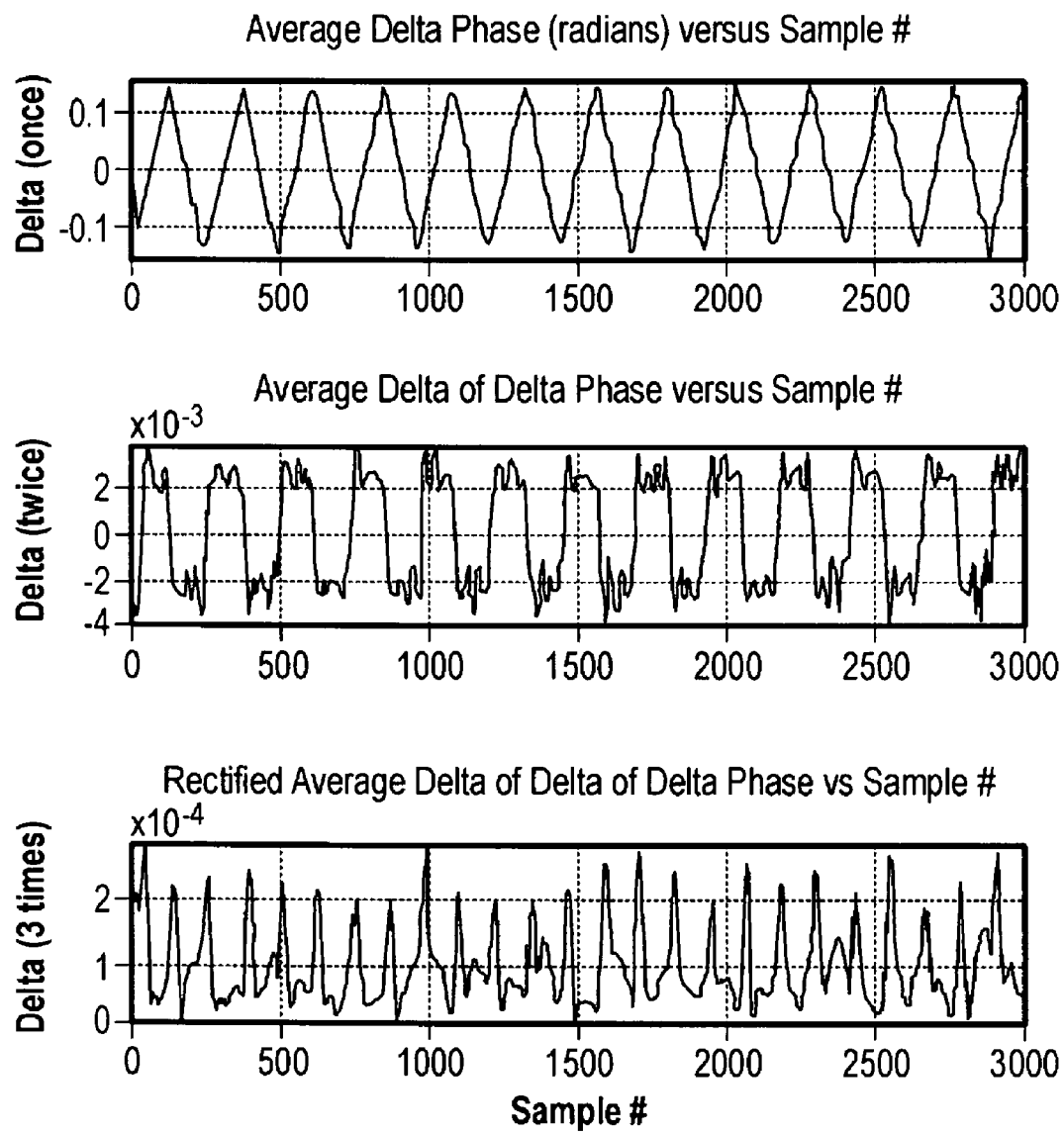
FIG. 13 shows plots of average delta phase versus sample number, average delta of delta phase versus sample number, and rectified average delta of delta of delta phase versus sample number according to one exemplary embodiment of the disclosed methods and systems.
Figure 14:
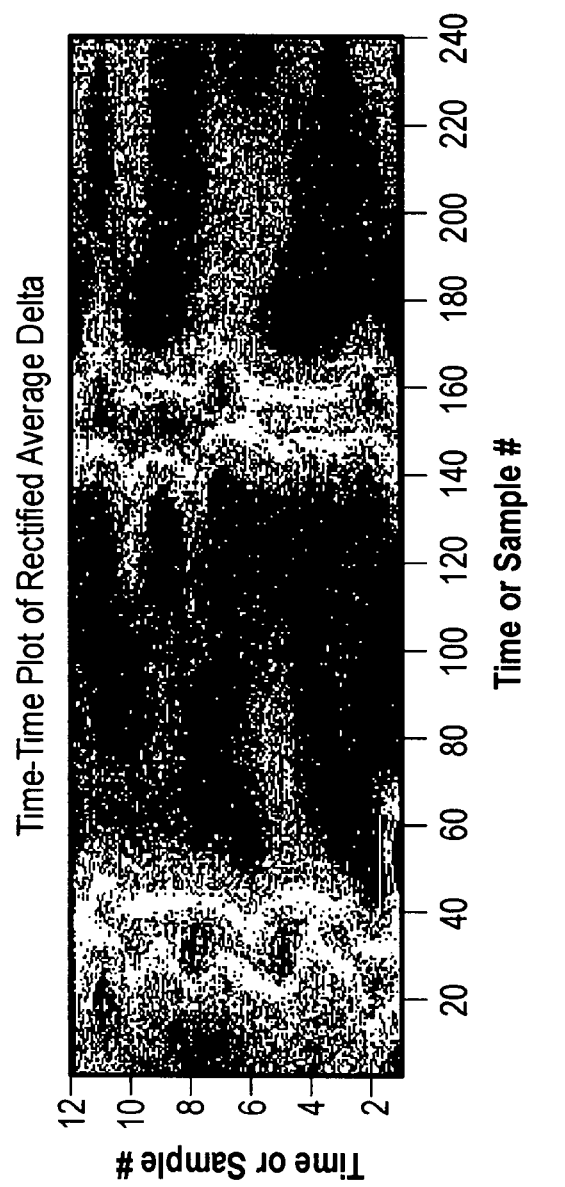
FIG. 14 is a time-time plot of rectified average delta frequency slope according to one exemplary embodiment of the disclosed methods and systems.
Figure 15:
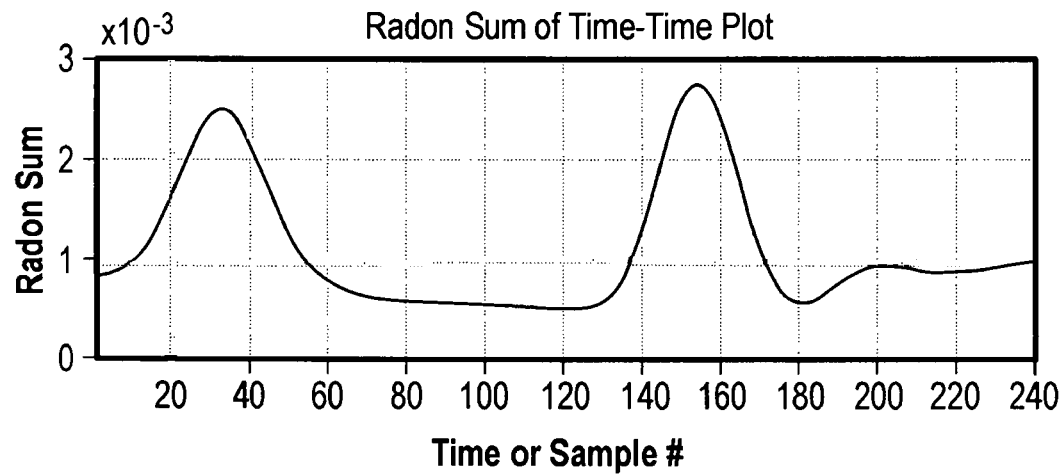
FIG. 15 is a Radon sum plot of the time-time plot data of FIG. 14 according to one exemplary embodiment of the disclosed methods and systems.

FIGS. 13 through 15 illustrate one exemplary embodiment in which the disclosed methods and systems may be utilized to detect changes in a signal with a given baud, in this case a triangular FMCW signal having a period of 30 μsec with a SNR of 5 at a bandwidth of 32 MHz. As first shown in FIG. 13, the average of the delta changes are computed three times (i.e., in three stages) starting from the unwrapped phase of the I-Q samples. In FIG. 13, the upper time series plot is the equivalent of frequency versus time, the middle time series plot is the equivalent of frequency slope versus time, and the bottom time series plot represents frequency slope changes versus time. Appropriate filters (e.g., low-pass filter to reduce differentiation noise) may also be applied at each stage to smooth the time series. In this exemplary embodiment, the final (bottom) time series plot of FIG. 13 is used to compute the time-time plot of FIG. 14. FIG. 15 shows the Radon sum result from summing the time-time plot of FIG. 14 (along lines parallel to the vertical), and appears much cleaner than the final (bottom plot) of FIG. 13. The Radon sum peaks of FIG. 15 give the instances where the initial frequency slope changes occur in the FMCW signal, and from the intervals between the two peaks, the rise and fall time may be deduced (the minimum interval is the sum of rise and fall time). Thus, it may be seen that the disclosed time-time plot Radon transform methodology is applicable to detection of repetitive synchronized signal events in any signal with a given baud from which a measure of event changes may be computed, e.g., FSK signals, polyphase signals, etc.

Figure 16:
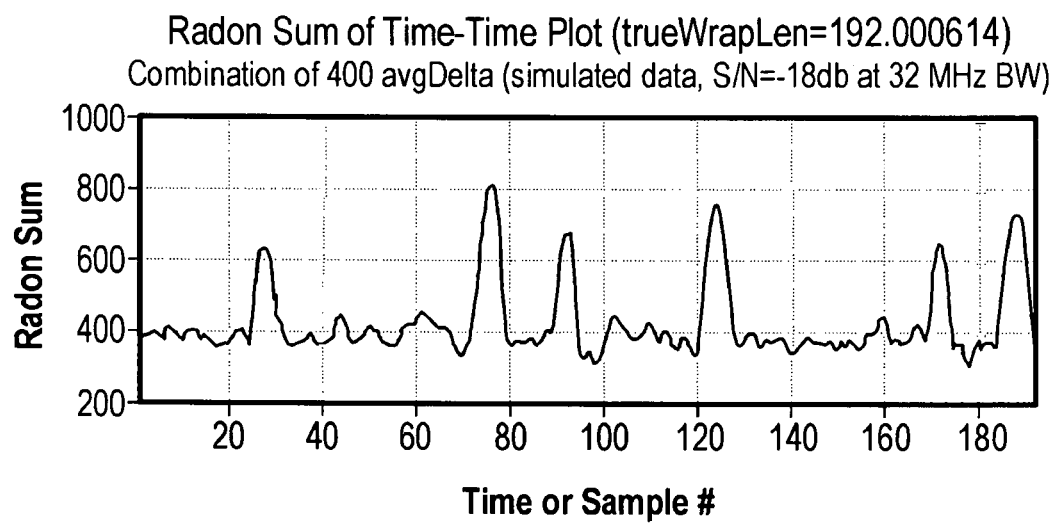
FIG. 16 is a Radon sum plot according to one exemplary embodiment of the disclosed methods and systems.

FIG. 16 illustrates one exemplary embodiment in which a dwell contains a repeatable "group" pattern, which is revealed in the Radon sum of time-time plot as shown. In this exemplary embodiment, the group consist of "level" intervals of 3T, T and 2T, which are repeated consecutively in the dwell. In this embodiment, T may be recognized as the minimum interval from the data of FIG. 16. The SNR of the signal data for this embodiment is −18 db at 32 MHz bandwidth. At this low SNR, it would be virtually impossible to determine each phase transition by individual analysis, however, the disclosed methods and systems may be advantageously implemented to leverage in phase summation of 400 dwells to reveal the group pattern as shown in FIG. 16.

As disclosed herein, Radon sum of time-time plots of rectified average delta data $\Delta\Phi$, may be utilized to identify the initial time instances from whence subsequent event changes (e.g., phase transitions, frequency slope changes) may be located or approximately located. In one exemplary embodiment, this may be employed to enable focusing of re-computation around narrower regions of the data using different methods. For example, the methodology of U.S. Pat. No. 7,590,209 issued Sep. 15, 2009, (which has been incorporated herein by reference) may be employed to further reduce or eliminate potential for false recognition of event changes, or to identify a more exact location of the event changes, or to identify other events in the signal data.

Figure 18:
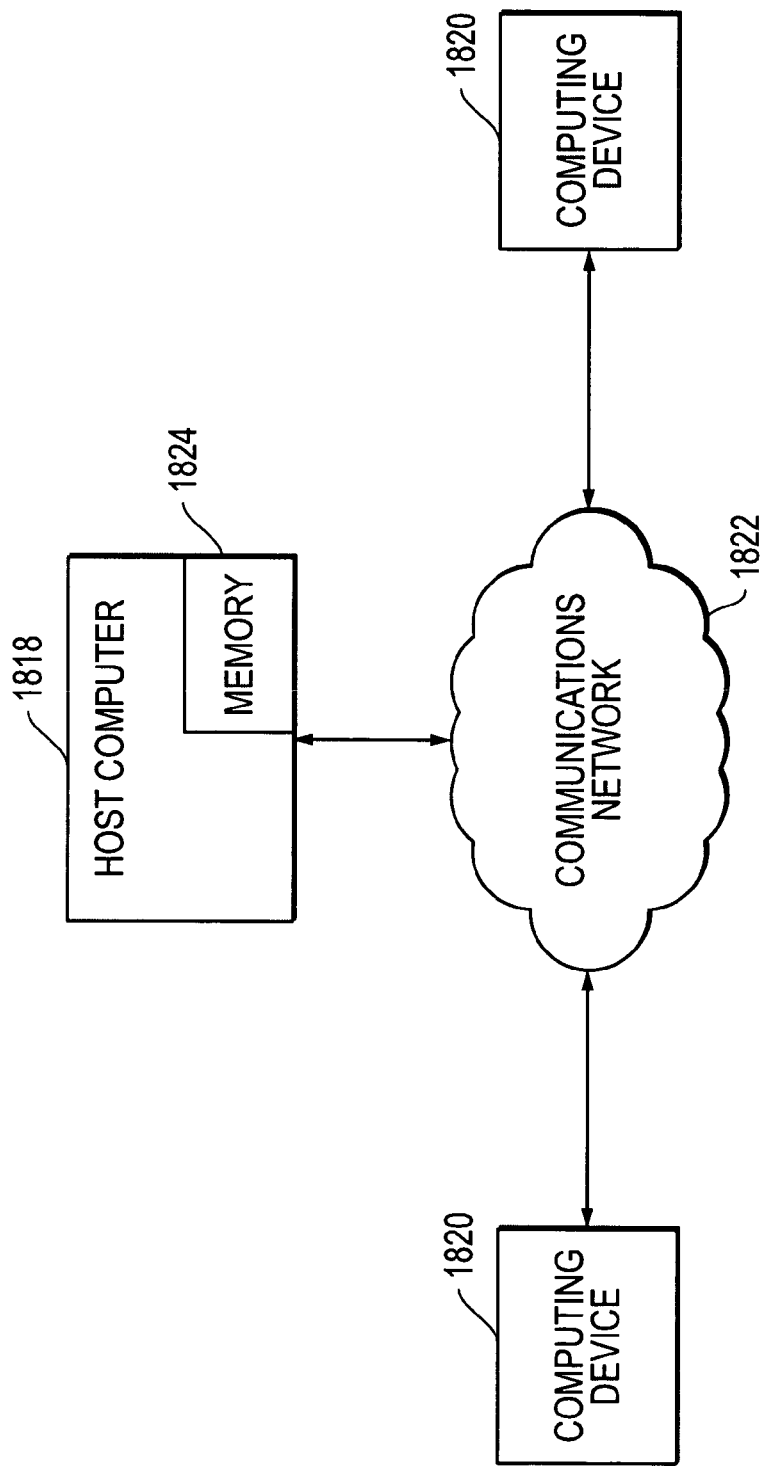
FIG. 18 is a block diagram of a system as it may be implemented according to one exemplary embodiment of the disclosed methods and systems.

The above-described method can be implemented in hardware, software, firmware, or a combination thereof. In a preferred embodiment, however, the method is implemented with a computer program operated by a host computer 1818 or other computing element, as illustrated in FIG. 18. The host computer 1818 may be in communication with a plurality of computing devices 1820 via a communications network 1822 and may be any computing device, such as a network computer running Windows NT, Novel Netware, Unix, or any other network operating system. The computer program and host computer 1818 illustrated and described herein are merely examples of a program and computer that may be used to implement the present invention and may be replaced with other software and computers or computing elements without departing from the scope of the present invention.

The computer program of the present invention is stored in or on computer-readable medium 1824 residing on or accessible by the host computer 1818 for instructing the host computer 1818 to execute the computer program of the present invention described herein. The computer program preferably comprises an ordered listing of executable instructions for implementing logical functions in the host computer 1818. The executable instructions may comprise a plurality of code segments operable to instruct the computer 1818 to perform the method of the present invention. It should be understood herein that one or more steps of the present method may be employed in one or more code segments of the present computer program. For example, a code segment executed by the computer may include one or more steps of the inventive method.

The computer program may be embodied in any computer-readable medium 1824 for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" 1824 may be any means that can contain, store, communicate, propagate or transport the program for use by or in connection with the instruction execution system, apparatus, or device. The computer-readable medium 1824 can be, for example, but not limited to, an electronic, magnetic, optical, electromagnetic, infrared, or semi-conductor system, apparatus, device, or propagation medium. More specific, although not inclusive, examples of the computer-readable medium 1824 would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium 1824 could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method of processing signal data, comprising:
providing one or more processors;
receiving a time series of said signal data; and
using one or more of the processors to process the signal data;
where the one or more processors are programmed to process the signal data by performing the following steps:
obtaining reinforceable repetitive synchronous data from said time series of signal data,
obtaining time-time data from said reinforceable repetitive synchronous data, said time-time data comprising multiple data traces, each of said multiple data traces corresponding to a different time segment of the time series than each other of said multiple data traces,
adding said time-time data in phase across said multiple data traces in a straight line to obtain a sum of said time-time data, and
outputting said sum of said time-time data for at least one of display, storage, or further processing; and
wherein said reinforceable repetitive synchronous data comprises rectified average delta data.

2. The method of claim 1, where the one or more processors are programmed to process the signal data by performing the following steps: identifying a high amplitude event in said sum of said time-time data, and determining the presence of a repetitive synchronous event in said signal data from said high amplitude event.

3. The method of claim 1, where the one or more processors are programmed to process the signal data by performing the following steps: identifying a synchronous pattern within said sum of said time-time data, and determining one or more characteristics of said signal data.

4. The method of claim 1, where the one or more processors are programmed to process the signal data by performing the following steps: providing an initial estimate of element length of a repetitive synchronous event in said signal data, then orienting said multiple data traces of said time-time data relative to each other based on said estimated element length prior to adding said time-time data in phase across said multiple data traces in a straight line and such that the wrap around length of each data trace is equal to the element length or a multiple of the element length, and then determining a revised estimate of said element length based on said sum of said time-time data.

5. The method of claim 4, where the one or more processors are programmed to process the signal data by performing the following steps: obtaining an amplitude spectrum of said reinforceable repetitive synchronous data, and then providing said initial estimate of element length of said repetitive synchronous event from said amplitude spectrum of said reinforceable repetitive synchronous data.

6. The method of claim 5, where the one or more processors are programmed to process the signal data by performing the following steps: applying a Fast Fourier Transform to said reinforceable repetitive synchronous data to obtain said amplitude spectrum, and adding said time-time data in phase across said multiple data traces in a straight line to obtain a Radon sum of said time-time data.

7. The method of claim 4, where the one or more processors are programmed to process the signal data by performing the steps of adding said time-time data in phase across said multiple data traces in a straight line to obtain a Radon sum of said time-time data that includes one or more peaks; and determining a revised estimate of said element length to be equal to either of:
 the wrap around length of the time-time data in the case where the Radon sum of said time-time data includes a single peak; or
 the distance between the two closest peaks in the case where the Radon sum of said time-time data includes multiple peaks.

8. The method of claim 4, where the one or more processors are programmed to process the signal data by performing the steps of adding said time-time data in phase across said multiple data traces in a straight line to obtain Radon sums of said time-time data corresponding to multiple wrap around length estimates; and then determining a revised estimate of said element length to be equal to the wrap around length of the time-time data corresponding to the Radon sum having a peak with the largest Radon sum value.

9. The method of claim 1,
 where the one or more processors are programmed to process the signal data by performing the following steps:
  obtaining I-Q data from said time series of said signal data,
  obtaining reinforceable repetitive synchronous data from said I-Q data of said time series of said signal data,
  obtaining time-time data from said reinforceable repetitive synchronous data corresponding to said time series of said signal data, said time-time data comprising multiple data traces with each of said multiple data traces corresponding to a different time segment of the time series than each other of said multiple data traces, and
  adding said time-time data in phase across multiple data traces in a straight line to obtain a sum of said time-time data corresponding to said time series of said signal data.

10. The method of claim 1, said method comprising:
 receiving multiple time series of said signal data; and
 where the one or more processors are programmed to process the signal data performing the following steps:
  obtaining I-Q data from said multiple time series of said signal data,
  obtaining reinforceable repetitive synchronous data from said I-Q data of each of said multiple time series of said signal data,
  adding said reinforceable repetitive synchronous data corresponding to said multiple time series of said signal data to obtain a sum of reinforceable repetitive synchronous data,
   obtaining time-time data from said sum of reinforceable repetitive synchronous data, said time-time data comprising multiple data traces, each of said multiple data traces corresponding to a different time segment of a time series than each other of said multiple data traces, and
   adding said time-time data in phase from said sum of reinforceable repetitive synchronous data across said multiple data traces in a straight line to obtain a sum of said time-time data corresponding to said multiple time series of said signal data.

11. The method of claim 1, further comprising:
 providing a non-transitory memory storing a computer program of instructions; and
 where the one or more processors are programmed to process the signal data by performing the following steps:
  obtaining reinforceable repetitive synchronous data from said signal data,
  obtaining time-time data from said reinforceable repetitive synchronous data, said time-time data comprising multiple data traces, each of said multiple data traces corresponding to a different time segment of the time series than each other of said multiple data traces,
  adding said time-time data in phase across said multiple data traces in a straight line to obtain a sum of said time-time data, and
  outputting said sum of said time-time data for at least one of display, storage, or further processing.

12. A non-transitory tangible computer readable medium including a computer program of instructions, the computer program of instructions comprising code that is executable one or more processors to detect repetitive synchronized signal events from a received time series of signal data by performing the following steps:
 obtaining reinforceable repetitive synchronous data from said time series of data;
 obtaining time-time data comprising multiple data traces, each of said data traces corresponding to a different time segment of the time series than each other of said multiple data traces;
 adding said time-time data in phase across said multiple data traces in a straight line to obtain a sum of said time time data; and
 outputting the sum of said time-time data for at least one of display, storage, or further processing;
 wherein reinforceable repetitive synchronous data comprises rectified average delta data.

13. The computer readable medium of claim 12, wherein said signal data comprises raw signal data that includes at least one signal, said repetitive synchronized signal event corresponding to said at least one signal.

14. The computer readable medium of claim 13, wherein said signal comprises a phase-shift key (PSK) signal and said repetitive synchronized signal event comprises a phase transition in said PSK signal; or wherein said signal comprises a frequency modulated continuous wave (FMCW) signal and said repetitive synchronized signal event comprises a frequency slope change in said FMCW signal; or wherein said signal comprises a frequency-shift key (FSK) signal and said repetitive synchronized signal event comprises a frequency transition in said FSK signal.

15. The computer readable medium of claim 13, wherein said repetitive synchronized signal event comprises an envelope in the said signal encoding a fixed periodic data pattern.

16. The computer readable medium of claim 13, wherein said signal comprises a radar signal.

17. The computer readable medium of claim 13, where the computer program of instructions further comprises code that is executable by one or more processors to determine the signal type of said signal based on said in-phase sum of reinforceable repetitive synchronous data obtained from said signal data.

18. The computer readable medium of claim 17, where the computer program of instructions further comprises code that is executable by one or more processors to obtain I-Q data from said signal data, and obtain unwrapped phase of said I-Q data; wherein said signal comprises a PSK signal and wherein said in-phase sum of reinforceable repetitive synchronous data is obtained from delta phase data obtained from the unwrapped phase of I-Q data of said signal data; or wherein said signal comprises a FSK signal and wherein said in-phase sum of reinforceable repetitive synchronous data is obtained from a differentiation of delta phase data obtained from the unwrapped phase of I-Q data of said signal data; or wherein said signal comprises a FMCW signal and wherein said in-phase sum of reinforceable repetitive synchronous data is obtained from a double differentiation of delta phase data obtained from the unwrapped phase of I-Q data of said signal data.

19. The computer readable medium of claim 17, where the computer program of instructions further comprises code that is executable by one or more processors to obtain I-Q data from said signal data, differentiate the I-Q data, and obtain an envelope from the differentiated I and Q data; wherein said signal comprises a FSK signal and wherein said in-phase sum of reinforceable repetitive synchronous data is obtained from a level change detection of the envelope obtained from the differentiated I and Q data of said signal data; or wherein said signal comprises a FMCW signal and wherein said in-phase sum of reinforceable repetitive synchronous data is obtained from a frequency peak detection of the envelope obtained from the differentiated I and Q data of said signal data.

20. The computer readable medium of claim 17, where the computer program of instructions further comprises code that is executable by one or more processors to perform at least one of the following three sets of steps:
obtain I-Q data from said signal data, obtain unwrapped phase of said I-Q data, and obtain an envelope from the I and Q data encoding a fixed periodic data pattern; wherein said signal comprises a PSK signal and wherein said in-phase sum of reinforceable repetitive synchronous data is obtained from the envelope of the unwrapped phase of I and Q data of said signal data encoding a fixed periodic data pattern;
obtain I-Q data from said signal data, differentiate the I-Q data, and obtain an envelope from the I and Q data encoding a fixed periodic data pattern; wherein said signal comprises a FSK signal and wherein said in-phase sum of reinforceable repetitive synchronous data is obtained from the envelope obtained from the differentiated I and Q data of said signal data encoding a fixed periodic data pattern; and
obtain I-Q data from said signal data, differentiate the I-Q data, and obtain an envelope from the I and Q data encoding a fixed periodic data pattern; wherein said signal comprises a FMCW signal and wherein said in-phase sum of reinforceable repetitive synchronous data is obtained from the envelope obtained from the differentiated I and Q data of said signal data encoding a fixed periodic data pattern.

21. The computer readable medium of claim 12, where the computer program of instructions further comprises code that is executable by one or more processors to determine a minimum element length of said repetitive synchronous event based on said in-phase sum of reinforceable repetitive synchronous data obtained from said signal data.

22. The computer readable medium of claim 12, where the computer program of instructions further comprises code that is executable by one or more processors to receive said signal data; and perform said step of detecting the presence of said repetitive synchronized signal event in real time as said signal data is received.

23. A system for processing signal data, comprising one or more processors, one or more of the processors programmed to:
receive a time series of said signal data;
obtain I-Q data from said time series of signal data;
obtain reinforceable repetitive synchronous data from said I-Q data;
obtain time-time data from said reinforceable repetitive synchronous data, said time-time data comprising multiple data traces, each of said multiple data traces corresponding to a different time segment of the time series than each other of said multiple data traces;
add said time-time data in phase across said multiple data traces in a straight line to obtain a sum of said time-time data corresponding to said time series of said signal data; and
output the sum of said time-time data for at least one of display, storage, or further processing;
wherein said reinforceable repetitive synchronous data comprises rectified average delta data.

24. The system of claim 23, wherein one or more of the processors are further programmed to identify a high amplitude event in said sum of said time-time data, and to determine the presence of a repetitive synchronous event in said signal data from said high amplitude event.

25. The system of claim 23, wherein one or more of the processors are further programmed to identify a synchronous pattern in said sum of said time-time data, and to determine one or more characteristics of said signal data.

26. The system of claim 23, wherein one or more of the processors are further programmed to:
provide an initial estimate of element length of a repetitive synchronous event in said signal data;
then orient said multiple data traces of said time-time data relative to each other based on said estimated element length prior to adding said time-time data in phase across said multiple data traces, and such that a wrap around length of each data trace is equal to the element length or a multiple of the element length; and
then determine a revised estimate of said element length based on said sum of said time-time data.

27. The system of claim 26, wherein one or more of the processors are further programmed to obtain an amplitude spectrum of said reinforceable repetitive synchronous data; and then to provide said initial estimate of element length of said repetitive synchronous event from said amplitude spectrum of said reinforceable repetitive synchronous data.

28. The system of claim 27, wherein one or more of the processors are further programmed to apply a Fast Fourier Transform to said reinforceable repetitive synchronous data to obtain said amplitude spectrum; and to add in phase data across said multiple data traces in a straight line to obtain a Radon sum of said time-time data.

29. The system of claim 26, wherein one or more of the processors are further programmed to:
  add said time-time data in phase across said multiple data traces in a straight line to obtain a Radon sum of said time-time data that includes one or more peaks; and determine a revised estimate of said element length to be equal to either of:
    the wrap around length of the time-time data in the case where the Radon sum of said time-time data includes a single peak, or
    the distance between the two closest peaks in the case where the Radon sum of said time-time data includes multiple peaks.

30. The system of claim 26, wherein one or more of the processors are further programmed to add said time-time data in phase across said multiple data traces in a straight line to obtain Radon sums of said time-time data corresponding to multiple wrap around length estimates; and then determine a revised estimate of said element length to be equal to the wrap around length of the time-time data corresponding to the Radon sum having a peak with the largest Radon sum value.

31. The system of claim 23, wherein one or more of the processors are further programmed to:
  receive multiple time series of said signal data;
  obtain I-Q data from each of said multiple time series of said signal data;
  obtain reinforceable repetitive synchronous data from said I-Q data of each of said multiple time series of said signal data;
  add said reinforceable repetitive synchronous data corresponding to said multiple time series of said signal data to obtain a sum of reinforceable repetitive synchronous data;
  obtain time-time data from said sum of reinforceable repetitive synchronous data, said time-time data comprising multiple data traces, each of said multiple data traces corresponding to a different time segment of a time series than each other of said multiple data traces; and
  add said time-time data from said sum of reinforceable repetitive synchronous data in phase across said multiple data traces in a straight line to obtain a sum of said time-time data corresponding to said multiple time series of said signal data.

32. A system for detecting repetitive synchronized signal events, said system comprising one or more processors, the one or more processors being programmed to operate as an event detector, said event detector being configured to receive a time series of signal data and detect repetitive signal events from said received time series of signal data by:
  obtaining reinforceable repetitive synchronous data from said time series of data;
  obtaining time-time data comprising multiple data traces, each of said data traces corresponding to a different time segment of the time series than each other of said multiple data traces;
  adding said time-time data in phase across said multiple data traces in a straight line to obtain a sum of said time time data; and
  outputting the sum of said time-time data for at least one of display, storage, or further processing;
  wherein reinforceable repetitive synchronous data comprises rectified average delta data.

33. The system of claim 32, wherein said signal data comprises raw signal data that includes at least one signal; wherein said repetitive synchronized signal event corresponds to said at least one signal; and wherein said system further comprises receive path circuitry coupled to receive said raw signal data from at least one antenna, said receive path circuitry being coupled between said antenna and said one or more processors programmed to implement the event detector.

34. The system of claim 33, wherein said signal comprises a phase-shift key (PSK) signal and said repetitive synchronized signal event comprises a phase transition in said PSK signal; or wherein said signal comprises a frequency modulated continuous wave (FMCW) signal and said repetitive synchronized signal event comprises a frequency slope change in said FMCW signal; or wherein said signal comprises a frequency-shift key (FSK) signal and said repetitive synchronized signal event comprises a frequency transition in said FSK signal.

35. The system of claim 23, further comprising:
  a non-transitory memory storing a computer program of instructions; and
  wherein the one or more of the processors are configured to execute the computer program of instructions to:
    receive said time series of signal data,
    obtain I-Q data from said signal data,
    obtain reinforceable repetitive synchronous data from said I-Q data,
    obtain time-time data from said reinforceable repetitive synchronous data, said time-time data comprising multiple data traces, each of said multiple data traces corresponding to a different time segment of the time series than each other of said multiple data traces, and
    add said time-time data in phase across said multiple data traces in a straight line to obtain a sum of said time-time data.

36. The system of claim 33, wherein said repetitive synchronized signal event comprises an envelope in the said signal encoding a fixed periodic data pattern.

37. The system of claim 33, wherein said signal comprises a radar signal.

38. The system of claim 33, wherein said event detector is further configured to determine the signal type of said signal based on said in-phase sum of reinforceable repetitive synchronous data obtained from said signal data.

39. The system of claim 38, wherein said signal comprises a PSK signal and wherein said event detector is configured to obtain I-Q data from said signal data, obtain unwrapped phase of said I-Q data, and obtain an in-phase sum of reinforceable repetitive synchronous data from delta phase data obtained from the unwrapped phase of I-Q data of said signal data; or
  wherein said signal comprises a FSK signal and wherein event detector is configured to obtain I-Q data from said signal data, obtain unwrapped phase of said I-Q data, and obtain said in-phase sum of reinforceable repetitive synchronous data from a differentiation of delta phase data obtained from the unwrapped phase of I-Q data of said signal data; or
  wherein said signal comprises a FMCW signal and wherein said event detector is configured to obtain I-Q data from said signal data, obtain unwrapped phase of said I-Q data, and obtain an in-phase sum of reinforceable repetitive synchronous data from a double differentiation of delta phase data obtained from the unwrapped phase of I-Q data of said signal data.

40. The system of claim 38, wherein said signal comprises a FSK signal and wherein said event detector is configured to obtain I-Q data from said signal data, differentiate the I-Q data, obtain an envelope from the differentiated I and Q data, and obtain an in-phase sum of reinforceable repetitive synchronous data from a level change detection of the envelope obtained from the differentiated I and Q data of said signal data; or wherein said signal comprises a FMCW signal and wherein said event detector is configured to obtain I-Q data from said signal data, differentiate the I-Q data, obtain an envelope from the differentiated I and Q data, and obtain an in-phase sum of reinforceable repetitive synchronous data from a frequency peak detection of the envelope obtained from the differentiated I and Q data of said signal data.

41. The system of claim 38, wherein said signal comprises a PSK signal and wherein said event detector is configured to to obtain I-Q data from said signal data, obtain an envelope from the I and Q data encoding a fixed periodic data pattern, and obtain an in-phase sum of reinforceable repetitive synchronous data from the envelope of the unwrapped phase of I and Q data of said signal data encoding a fixed periodic data pattern; or wherein said signal comprises a FSK signal and wherein said event detector is configured to to obtain I-Q data from said signal data, different the I-Q data, obtain an envelope from the differentiated I and Q data encoding a fixed periodic data pattern, and obtain an in-phase sum of reinforceable repetitive synchronous data from the envelope obtained from the differentiated I and Q data of said signal data encoding a fixed periodic data pattern; or wherein said signal comprises a FMCW signal and wherein said event detector is configured to to obtain I-Q data from said signal data, different the I-Q data, obtain an envelope from the differentiated I and Q data encoding a fixed periodic data pattern, and obtain an in-phase sum of reinforceable repetitive synchronous data from the envelope obtained from the differentiated I and Q data of said signal data encoding a fixed periodic data pattern.

42. The system of claim 32, wherein said event detector is further configured to determine a minimum element length of said repetitive synchronous event based on said in-phase sum of reinforceable repetitive synchronous data obtained from said signal data.

43. The system of claim 32, wherein said event detector is further configured to receive said signal data and to detect the presence of said repetitive synchronized signal event in real time as said signal data is received.

44. The system of claim 32, further comprising a non-transitory memory storing a computer program of instructions; and where one or more of the processors is configured to execute the computer program of instructions to implement the event detector.

45. A system for detecting repetitive synchronized signal events, said system comprising:

an antenna configure to receive radio frequency (RF) signal data;
receive path circuitry coupled to receive the RF signal data from the antenna and to provide the received RF signal data as digitized signal data;
event detector circuitry coupled to receive the digitized signal data from the receive path circuitry, the event detector circuitry comprising one or more processors programmed to:
obtain reinforceable repetitive synchronous data from a time series of the signal data,
obtain time-time data from the reinforceable repetitive synchronous data, the time-time data comprising multiple data traces, each of said multiple data traces corresponding to a different time segment of the time series than each other of said multiple data traces,
add the time-time data in phase across the multiple data traces in a straight line to obtain a sum of the time-time data,
detect the presence of a repetitive synchronized signal even in said signal data from said sum of time-time data, and
output the sum of the time-time data as a signal for at least one of display, storage, or further processing,
wherein said reinforceable repetitive synchronous data comprises rectified average delta data.

46. The system of claim 45, further comprising at least one of a display, storage or processor circuitry coupled to the event detector circuitry; and where the one or more processors of the event detector circuitry are further programmed to:
output the sum of the time-time data as a signal to at least one of the display, storage or processor circuitry for at least one of display, storage, or further processing.

47. A method for detecting repetitive synchronized signal events, said method comprising detecting the presence of said repetitive synchronized signal events by:
providing an antenna configure to receive radio frequency (RF) signal data;
providing receive path circuitry coupled to receive the RF signal data from the antenna and to provide the received RF signal data as digitized signal data;
providing event detector circuitry coupled to receive the digitized signal data from the receive path circuitry, the event detector circuitry comprising one or more processors; and
using the one or more of the processors of the event detector circuitry to perform the following steps:
obtain reinforceable repetitive synchronous data from a time series of the signal data,
obtain time-time data from the reinforceable repetitive synchronous data, the time-time data comprising multiple data traces, each of said multiple data traces corresponding to a different time segment of the time series than each other of said multiple data traces,
add the time-time data in phase across the multiple data traces in a straight line to obtain a sum of the time-time data,
detect the presence of a repetitive synchronized signal event in said signal data from sum of time-time data, and
output the sum of the time-time data as a signal to at least one of a display, storage, or further processing,
wherein said reinforceable repetitive synchronous data comprises rectified average delta data.

48. The method of claim 47, further comprising:
providing at least one of a display, storage or processor circuitry coupled to the event detector circuitry; and
using the one or more of the processors of the event detector circuitry to perform the following step:
output the sum of the time-time data as a signal to at least one of the display, storage or processor circuitry for at least one of display, storage, or further processing.

\* \* \* \* \*